US012669678B2

(12) United States Patent
Obikane

(10) Patent No.: US 12,669,678 B2
(45) Date of Patent: Jun. 30, 2026

(54) OPTICAL SYSTEM AND CAMERA DEVICE HAVING SAME

(71) Applicant: BEIJING XIAOMI MOBILE SOFTWARE CO., LTD., Beijing (CN)

(72) Inventor: Yasuhiko Obikane, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 223 days.

(21) Appl. No.: 18/288,559

(22) PCT Filed: Nov. 1, 2021

(86) PCT No.: PCT/CN2021/128002
§ 371 (c)(1),
(2) Date: Oct. 26, 2023

(87) PCT Pub. No.: WO2023/070681
PCT Pub. Date: May 4, 2023

(65) Prior Publication Data
US 2024/0210666 A1     Jun. 27, 2024

(51) Int. Cl.
*G02B 9/12*          (2006.01)
*G02B 13/00*         (2006.01)
*G02B 15/14*         (2006.01)

(52) U.S. Cl.
CPC ........... *G02B 9/12* (2013.01); *G02B 13/0045* (2013.01); *G02B 15/143503* (2019.08)

(58) Field of Classification Search
None
See application file for complete search history.

(56) References Cited

U.S. PATENT DOCUMENTS

2007/0258150 A1*  11/2007  Takato ................. G02B 13/006
                                                             359/686
2012/0212842 A1*   8/2012  Hosoi .................... G02B 15/22
                                                             359/784
2016/0147050 A1*   5/2016  Fujikura .............. H04N 23/663
                                                             359/689
2020/0033625 A1    1/2020  Suzuki
2021/0231930 A1*   7/2021  Miyagishima ......... G02B 13/04
                           (Continued)

FOREIGN PATENT DOCUMENTS

CN          101344636 A      1/2009
CN          113341536 A      9/2021
                           (Continued)

OTHER PUBLICATIONS

European Patent Application No. 21962031.7 Search Report dated Dec. 2, 2024, 9 pages.
                           (Continued)

*Primary Examiner* — Darryl J Collins
(74) *Attorney, Agent, or Firm* — Cozen O'Connor

(57)          ABSTRACT

An optical system has, sequentially from an object side to an image side, a first lens group including at least one lens and having a negative refractive power, a second lens group including at least one lens and having a positive refractive power, and a third lens group including at least one lens and having a negative refractive power. During focusing, distances from the first lens group and the third lens group to an imaging plane on an optical axis are fixed, and the second lens group is movable along the optical axis.

19 Claims, 16 Drawing Sheets

(56)     References Cited

U.S. PATENT DOCUMENTS

| 2021/0255442 | A1* | 8/2021 | Kondo | ................. | G02B 15/143 |
| 2022/0283415 | A1* | 9/2022 | Tsubonoya | ...... | G02B 15/144111 |

FOREIGN PATENT DOCUMENTS

| JP | 2003322796 | A | 11/2003 |
| JP | 2005077692 | A | 3/2005 |
| JP | 2011227362 | A | 11/2011 |
| JP | 2013007853 | A | 1/2013 |
| JP | 2013029658 | A | 2/2013 |
| JP | 5749629 | B2 | 7/2015 |
| JP | 2016161650 | A | 9/2016 |
| JP | 2018146607 | A | 9/2018 |
| JP | 2020016788 | A | 1/2020 |
| JP | 2021131425 | A | 9/2021 |
| JP | 2021173847 | A | 11/2021 |

OTHER PUBLICATIONS

PCT/CN2021/128002, International Search Report dated Jul. 19, 2022, 2 pages.
Japanese Patent Application No. 2021-573543, Office Action dated Dec. 8, 2023, 11 pages.
Japanese Patent Application No. 2021-573543, English translation of Office Action dated Dec. 8, 2023, 12 pages.
Korean Patent Application No. 10-2023-7038225 Office Action dated Mar. 31, 2025, with English translation 20 pages.

* cited by examiner

OPTICAL SYSTEM AND CAMERA DEVICE HAVING SAME

CROSS-REFERENCE TO RELATED APPLICATIONS

The present application is a U.S. national stage of International Application PCT/CN2021/128002, filed on Nov. 1, 2021, the contents of all of which are incorporated herein by reference in their entireties for all purposes.

FIELD

The present disclosure relates to an optical system having a plurality of lens groups and a camera device having the optical system.

BACKGROUND

Conventionally, optical systems that are capable of close photographing and wide angle are too thick and lack a sufficiently large field of view for certain applications.

SUMMARY

In a first aspect, an optical system has a first lens group including at least one lens and having a negative refractive power, a second lens group including at least one lens and having a positive refractive power and a third lens group including at least one lens and having a negative refractive power, sequentially from an object side to an image side; during focusing, distances between the first lens group and an imaging plane and between the third lens group and the imaging plane on an optical axis are fixed, and the second lens group moves along the optical axis; when a lateral magnification of the second lens group focusing at infinity is b2, a lateral magnification of the third lens group focusing at infinity is b3, a focal length of the entire optical system focusing at infinity is f, a focal length of the second lens group is f2, a focal length of the third lens group is f3, a total value of distances from a lens face closest to the object side to a lens face closest to the image side in each lens group is OAL123, and a maximum image height is Y, at least one of the following formulas (1) to (4) is satisfied:

$$-1.20 \leqslant f3/f \leqslant -0.10 \tag{1}$$

$$-0.40 \leqslant b2 \leqslant -0.06 \tag{2}$$

$$0.3 \leqslant OAL123/Y \leqslant 2.30 \text{ and } 1.00 \leqslant b3 \leqslant 1.30 \tag{3}$$

$$0.60 \leqslant f2/f \leqslant 0.90. \tag{4}$$

In a second aspect, a camera device of the present disclosure includes the optical system of the first aspect; and a photographing element arranged at the imaging plane of the optical system.

DETAILED DESCRIPTION

In the related art, in an optical system described in the patent document 1 (Japanese Patent communiqué No. 5749629) and an optical system described in the patent document 2 (Japanese special publication communiqué No. 2021-173847), magnification and focal length of each group are not appropriate, the field of view is insufficient, and miniaturization (thinning) of a size in an optical axis direction is insufficient.

An embodiment of the present disclosure will be described with reference to the drawings below.

Figure 1:
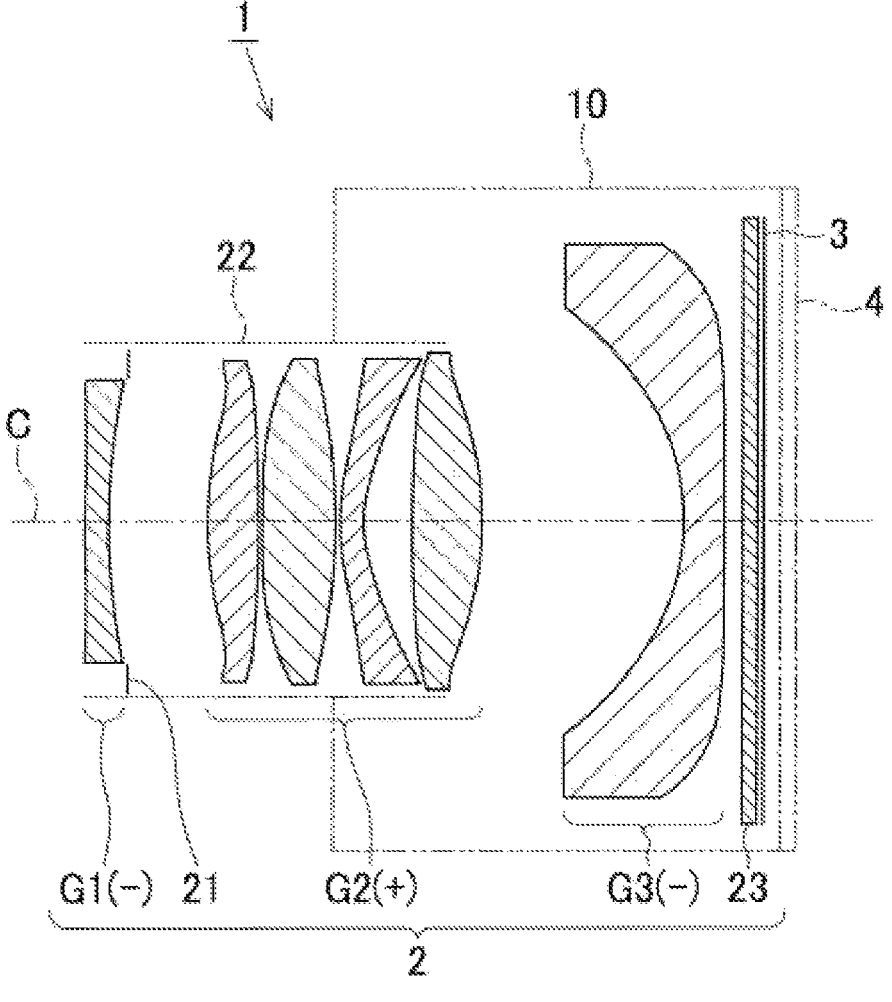
FIG. 1 is a schematic diagram showing a structure of a camera device according to an embodiment, showing a photographing state.
Figure 2:
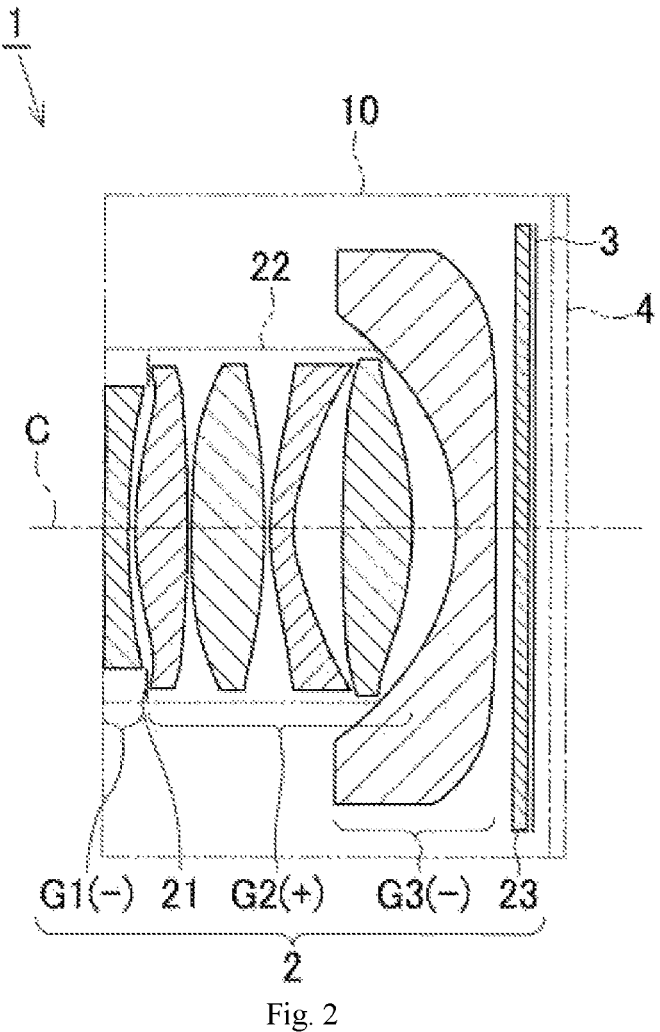
FIG. 2 is a schematic diagram showing a structure of the camera device, showing a state in which an optical system is housed.

As shown in FIGS. 1 and 2, a camera device 1 according to the embodiment has an optical system 2 that may be retracted in a camera device body 10, a photographing element 3 arranged at an imaging plane of the optical system 2, and a liquid crystal display screen 4 that displays photographing (image) data sent from the photographing element 3. The photographing element 3 converts an optical image formed by the optical system 2 into an electrical signal (photographing data). The photographing element 3 of the present embodiment is an image sensor.

The optical system 2 at least has a first lens group G1, a second lens group G2, and a third lens group G3 sequentially from an object side to an image side along an optical axis C. These lens groups G1, G2 and G3 each include at least one lens. The optical system 2 of the present embodiment includes a first lens group G1, a second lens group G2, a third lens group G3, and an optical filter 23 sequentially from the object side to the image side along the optical axis C.

In addition, in the optical system 2 of the present embodiment, the lens groups G1 to G3 are named for convenience, and also include a lens group composed of only one optical element (lens, etc.). That is, the first to third lens groups G1, G2 and G3 each have at least one optical element such as a lens. In addition, in the optical system 2, during focusing, positions on the optical axis C are divided according to boundary between fixed optical elements (lenses, etc.) and moving optical elements, and the at least one fixed optical element in a divided area is regarded as a lens group, and the at least one moving optical element in a divided area is regarded as another lens group.

In addition, the optical system 2 has an aperture diaphragm (aperture device) 21 disposed between the first lens group G1 and the second lens group G2, and a lens barrel 22 that holds the first lens group G1 and the second lens group G2 (see FIG. 1). The lens barrel 22 extends to the object side when photographing (see FIG. 1), and is retracted in the camera device body, etc. when photographing is not performed (see FIG. 2).

In the optical system 2, when focusing, distances between the first lens group G1 and the photographing element 3 (the imaging plane of the optical system 2) and between the third lens group G3 and the photographing element 3 (the imaging plane of the optical system 2) on the optical axis C are fixed, and the second lens group G2 moves along the optical axis C. That is, in the optical system 2 of the present embodiment, among the lens groups G1, G2 and G3, the second lens group G2 functions as a focusing lens group.

In addition, in this optical system 2, at least the first lens group G1 moves to the image side during retraction. When the optical system 2 of the present embodiment is retracted, the first lens group G1 and the second lens group G2 are separately moved to the image side and retracted in the camera device body 10 (see FIG. 2). At this time, the movement of the lens groups G1 to G3 and the extension and retraction of the lens barrel 22 are performed by various known mechanisms.

The lens groups G1-G3 in the optical system 2 will be described in detail below.

The first lens group G1 includes a lens (optical element) with a negative refractive power. In addition, the second lens group G2 includes a plurality of lenses (optical elements) with a positive refractive power. In addition, the third lens group G3 includes a plurality of lenses (optical elements) with a negative refractive power.

When a lateral magnification of the second lens group G2 focusing at infinity is b2, a lateral magnification of the third lens group G3 focusing at infinity is b3, a focal length of the entire optical system 2 focusing at infinity is f, a focal length of the second lens group G2 is f2, a focal length of the third lens group G3 is f3, a total value of distances from a lens face closest to the object side to a lens face closest to the image side in each lens group G1, G2, G3 is OAL123, and a maximum image height is Y, the optical system 2 satisfies at least one of the following formulas (1) to (4):

$$-1.20 \leqslant f3/f \leqslant -0.10 \qquad (1)$$

$$-0.40 \leqslant b2 \leqslant -0.06 \qquad (2)$$

$$0.3 \leqslant OAL123/Y \leqslant 2.30 \text{ and } 1.00 \leqslant b3 \leqslant 1.30 \qquad (3)$$

$$0.60 \leqslant f2/f \leqslant 0.90. \qquad (4)$$

In this optical system 2, since the first lens group G1 with the negative refractive power is arranged closest to the object side, it is easy to obtain a focal power configuration of retrofocus, and therefore, it is possible to realize wide-angle by shortening the focal length. In addition, since the third lens group G3 with the negative refractive power is arranged closest to the image side, it is easy to obtain a focal power configuration of long focus, and thus, it is possible to achieve thinness (miniaturization of a size in the optical axis C direction) by shortening the focal length of the second lens group G2.

Moreover, when focusing, the second lens group G2 may be moved to adjust the aberration variation balance with the front and rear groups (the first lens group G1 and the third lens group G3), so that bending variation of the imaging plane during close-up photographing may be suppressed compared with the optical system of the whole extension mode, and therefore the close-up photographing distance may be further shortened.

Moreover, when focusing, by fixing the distances between the first lens group G1 and the photographing element 3 (imaging plane) and between the third lens group G3 and the photographing element 3 (imaging plane) on the optical axis C, only the second lens group G2 may be moved in the direction of the optical axis C, thus reducing the load on the moving mechanism for the lens group G2 such as an actuator, and therefore, the optical system 2 may be thinned and miniaturized.

In addition, in the optical system 2 of the present embodiment, by satisfying the formula (1), a thin and bright optical system 2 may be obtained. The details are as follows.

Formula (1) specifies the range of a ratio (f3/f) of the focal length of the third lens group G3 to the focal length of the entire optical system 2 focusing at infinity. When the ratio (f3/f) is less than the lower limit (−1.20), the focal power of the third lens group G3 becomes weak, so it is difficult to achieve long focus and it is impossible to shorten the focal length of the second lens group G2, and therefore, the thinning is insufficient. On the other hand, when the ratio (f3/f) is greater than the upper limit (−0.10), the optical power of the third lens group G3 becomes strong, which makes it easy to be thinner. However, because the negative optical power of the group G3 (the third lens group) closest to the image side is too strong, it is difficult to form a bright (i.e., small F-number) optical system 2, which becomes a dark (i.e., large F-number) optical system. Therefore, in the optical system 2 of the present embodiment, by setting the ratio (f3/f) of the focal length of the third lens group G3 to the focal length of the entire optical system 2 focusing at infinity as the range of Formula (1), the balance between thinness and brightness may be achieved.

In addition, in the optical system 2 of the present embodiment, the ratio (f3/f) may satisfy the following formula:

$$-1.10 \leqslant f3/f \leqslant -0.50$$

It may satisfy the following formula:

$$-1.00 \leqslant f3/f \leqslant -0.70$$

In addition, in the optical system 2 of the embodiment, by satisfying the formula (2), it is possible to obtain a thin and wide-angle optical system 2. The details are as follows.

Formula (2) specifies the range of the lateral magnification (b2) of the second lens group G2 when focusing at infinity, and when this lateral magnification (b2) is less than the lower limit (−0.40), it is difficult to shorten the focal length of the second lens group G2, so it is difficult to sufficiently achieve thinness. On the other hand, when the lateral magnification (b2) is greater than the upper limit (−0.06), the optical power of the first lens group G1 becomes weak, so it is difficult to achieve the wide angle. Therefore, in the optical system 2 of the present embodiment, the lateral magnification (b2) of the second lens group G2 when focusing at infinity is set within the range of the formula (2), so that the balance between thinning and wide-angle may be achieved.

In addition, in the optical system 2 of the present embodiment, the lateral magnification (b2) may satisfy the following formula:

$$-0.38 \le b2 \le -0.10$$

It may satisfy the following formula:

$$-0.36 \le b2 \le -0.15$$

In addition, in the optical system 2 of the present embodiment, by satisfying the formula (3), a high-performance, thin and bright optical system 2 may be obtained. The details are as follows.

The first formula (0.3≤OAL123/Y≤2.30) of formula (3) specifies the range of the ratio (OAL123/Y) of the total value of the distances from the lens face closest to the object side to the lens face closest to the image side in each lens group G1, G2 and G3, to the maximum image height. When the ratio (OAL123/Y) is less than the lower limit value (0.3), the thickness of each lens group G1, G2 and G3 is too thin (that is, the size in the direction of the optical axis C is too small), and aberration correction becomes difficult, so it becomes difficult to achieve high performance. On the other hand, when the ratio (OAL123/Y) is greater than the upper limit (2.30), the thicknesses of the lens groups G1, G2 and G3 are all too thick (that is, the dimensions in the direction of the optical axis Care too large), so it is difficult to be thinned. Therefore, in the optical system 2 of the present embodiment, the ratio of the total value of the distances from the lens face closest to the object side to the lens face closest to the image side in each lens group G1, G2 and G3 to the maximum image height (OAL123/Y) is the first formula (0.3≤OAL123/Y≤2.30) of the formula (3), so that balance between high performance and thinness may be achieved.

In addition, the total value of the distances from the lens face closest to the object side to the lens face closest to the image side in each lens group G1, G2 and G3 refers to a sum of a distances from a lens face closest to the object side to a lens face closest to the image side in the first lens group G1, a distance from a lens face closest to the object side to a lens face closest to the image side in the second lens group G2, and a distance from a lens face closest to the object side to a lens face closest to the image side in the third lens group G3.

In addition, in the optical system 2 of the present embodiment, the ratio (OAL123/Y) may satisfy the following formula.

$$0.50 \le OAL123/Y \le 2.00$$

6

It may satisfy the following formula.

$$0.80 \le OAL123/Y \le 1.80$$

In addition, a second formula (1.00≤b3≤1.30) of formula (3) specifies the range of the lateral magnification (b3) of the third lens group G3 when focusing at infinity. When this lateral magnification (b3) is less than the lower limit (1.00), it is difficult to shorten the focal length of the second lens group G2, so it is difficult to make it sufficiently thin. On the other hand, when the lateral magnification (b3) is greater than the upper limit value (1.30), the optical power of the third lens group G3 becomes strong, which makes it easy to be thinner, but the negative optical power of the group closest to the image side (third lens group) G3 is too strong, it is difficult to form a bright (i.e., small F number) optical system 2, which becomes a dark (i.e., large F number) optical system. Therefore, in the optical system 2 of the present embodiment, by setting the lateral magnification (b3) of the third lens group G3 when focusing at infinity as the second formula (1.00≤b3<1.30) of the formula (3), the balance between thinness and brightness may be achieved.

In addition, in the optical system 2 of the present embodiment, the lateral magnification (b3) may satisfy the following formula.

$$1.05 \le b3 \le 1.26$$

It may satisfy the following formula.

$$1.10 \le b3 \le 1.24$$

In addition, in the optical system 2 of the present embodiment, by satisfying the formula (4), it is possible to obtain a high-performance and thin optical system 2. The details are as follows.

Formula (4) specifies the range of the ratio (f2/f) of the focal length of the second lens group G2 to the focal length of the entire optical system 2 when focusing at infinity. When this ratio (f2/f) is less than the lower limit (0.60), the optical power of the second lens group G2 becomes strong, and aberration correction becomes difficult, so it becomes difficult to achieve high performance. On the other hand, when the ratio (f2/f) is greater than the upper limit (0.90), the optical power of the second lens group G2 becomes weak, and the positive optical power of the entire optical system 2 becomes weak, so it becomes difficult to make the optical system 2 thinner. Therefore, in the optical system 2 of the present embodiment, by setting the ratio (f2/f) of the focal length of the second lens group G2 to the focal length of the entire optical system 2 when focusing at infinity as the range of Formula (4), a balance between high performance and thinness may be achieved.

In addition, in the optical system 2 of the present embodiment, the ratio (f2/f) may satisfy the following formula.

$$0.70 \le f2/f \le 0.85$$

It may satisfy the following formula.

$$0.75 \leqslant f2/f \leqslant 0.80$$

In addition, in the optical system 2, the second lens group G2 is configured to be further movable in a direction orthogonal to the optical axis C when the optical hand shake is corrected, and it can satisfy the following formula.

$$1.00 \leqslant (1 - b2) \times b3 \leqslant 1.90.$$

According to this configuration, it is possible to obtain an optical system 2 that can easily ensure accuracy of a stop position when the lens group G2 moves in the direction orthogonal to the optical axis C in the optical hand shake correction, and is miniaturized. The details are as follows.

In the optical hand shake correction by optical image stabilization (OIS) of the existing optical system, it is necessary to move (displace) the optical system or the photographing element in an orthogonal direction with respect to the optical axis. Therefore, as the optical system 2 of the present embodiment, only a part of the lens group G2 (the second lens group) among the plurality of lens groups G1, G2 and G3 of the optical system 2 may be moved in the orthogonal direction with respect to the optical axis C, so that weight of a unit moving in the orthogonal direction to the optical axis C during OIS may be suppressed (i.e., the weight may be reduced). As a result, the load of the driving system for driving the unit is suppressed, and therefore, the optical system 2 and the camera device 1 having the optical system 2 may be miniaturized. In addition, when this optical system 2 is applied to a camera device 1 having a large photographing element 3, this effect may be remarkably obtained.

In addition, the above formula specifies the range of a ratio of a movement amount of the second lens group G2 when the second lens group G2 is moved in the orthogonal direction with respect to the optical axis C to a movement amount of the image in the orthogonal direction with respect to the optical axis C generated by the movement of the second lens group G2, which is obtained by using the calculation formula ((1−b2)×b3) of the lateral magnification of the second lens group G2 when focusing at infinity and the lateral magnification of the third lens group G3 when focusing at infinity. When the ratio (the value of the calculation formula) is less than the lower limit value (1.00), the movement amount of the image in the orthogonal direction with respect to the optical axis C generated by the movement of the second lens group G2 is small, so it is necessary to increase the movement amount of the second lens group G2 during OIS (the movement in the orthogonal direction), so the load of the driving system increases, and it becomes difficult to miniaturize the optical system 2 and the entire camera device 1 having the optical system 2. On the other hand, when the ratio (the value of the calculation formula) is greater than the upper limit value (1.90), the movement amount of the image in the orthogonal direction relative to the optical axis due to the movement of the second lens group G2 becomes larger (that is, becoming sensitive), so it is difficult to ensure the accuracy of the stop position of the lens group G2 when the lens group G2 moves in the direction orthogonal to the optical axis C in the optical hand shake correction. Therefore, in the optical system 2 of the present embodiment, by setting the ratio of the movement amount of the second lens group G2 when the second lens group G2 moves in the orthogonal direction with respect to the optical axis C to the movement amount of the image in the orthogonal direction with respect to the optical axis C due to the movement of the second lens group G2 (the value of the calculation formula) as the range of the above formula, balance between miniaturization and difficulty in ensuring the accuracy of the stop position of the lens group G2 when the lens group G2 moves in the direction orthogonal to the optical axis C may be realized.

In addition, in the optical system 2 of the present embodiment, the ratio (the value of the calculation formula) may satisfy the following formula.

$$1.15 \leqslant (1 - b2) \times b3 \leqslant 1.80$$

It may satisfy the following formula.

$$1.30 \leqslant (1 - b2) \times b3 \leqslant 1.70$$

In addition, in the optical system 2, when a focal length of the first lens group G1 is f1, the following formula may be satisfied.

$$-16.00 \leqslant f1/f \leqslant -1.80$$

According to this configuration, it is possible to obtain a wide-angle and thin optical system 2. The details are as follows.

The above formula specifies a range of a ratio (f1/f) of the focal length of the first lens group G1 to the focal length of the entire optical system 2 when focusing at infinity. When this ratio (f1/f) is less than the lower limit (−16.00), the optical power of the first lens group G1 becomes weak, and the negative optical power on the object side becomes weak, so wide-angle photographing becomes difficult. On the other hand, when the ratio (f1/f) is greater than the upper limit (−1.80), the optical power of the first lens group G1 becomes strong, so the number of lenses is increased for the positive optical power of the second lens group G2, which makes it difficult to make the optical system 2 thinner. Therefore, in the optical system 2 of the present embodiment, by setting the ratio (f1/f) of the focal length of the first lens group to the focal length of the entire optical system 2 when focusing at infinity as the range of the above formula, the balance between wide angle and thinness may be achieved.

In addition, in the optical system 2 of the present embodiment, the ratio (f1/f) may satisfy the following formula.

$$-10.00 \leqslant f1/f \leqslant -2.00$$

It may satisfy the following formula.

$$-6.00 \leqslant f1/f \leqslant -2.20$$

In addition, the optical system 2 has an aperture diaphragm (aperture device) 21 that can change an aperture diameter, and the aperture diaphragm 21 is arranged between the first lens group G1 and the second lens group G2.

When the aperture diaphragm (iris) 21 is arranged on the object side of the first lens group G1, the size of the optical system 2 in the optical axis direction is increased due to the thickness of this mechanism. However, as the above structure, the aperture diameter of the optical system 2 may be changed by arranging the aperture diaphragm 21 between the first lens group G1 and the second lens group G2, so that the optical system 2 may be made thinner.

In addition, in the optical system 2, when a distance from a lens face closest to the object side to the photographing element (i.e., the imaging plane) 3 in the optical system 2 is OAL, it can satisfy the following formula.

$$1.20 \leq OAL/f \leq 2.30$$

According to this configuration, the optical system 2 with high performance and thin thickness may be obtained. The details are as follows.

The above formula specifies the range of a ratio (OAL/f) between the distance from the lens face of the optical system 2 closest to the object side to the photographing element 3 and the focal length of the entire optical system 2 when focusing at infinity. When this ratio (OAL/f) is less than the lower limit (1.20), an optical total length of the optical system 2 becomes shorter, and aberration correction becomes difficult, so it becomes difficult to achieve high performance. On the other hand, when the ratio (OAL/f) is larger than the upper limit value (2.30), the optical total length of the optical system 2 becomes longer, so it is difficult to be thinner. Therefore, in the optical system 2 of the present embodiment, by the ratio (OAL/f) of the distance from the lens face of the optical system 2 closest to the object side to the photographing element (imaging plane) 3 and the focal length of the optical system 2 focusing at infinity as the range of the above formula, it is possible to achieve a balance between high performance and thinness.

In addition, in the optical system 2 of the present embodiment, the ratio (OAL/f) may satisfy the following formula:

$$1.35 \leq OAL/f \leq 2.10$$

It may satisfy the following formula.

$$1.50 \leq OAL/f \leq 190.$$

In addition, in the optical system 2, it can satisfy the following formula.

$$1.00 \leq \left(1 - b2^2\right) \times b3^2 \leq 1.70$$

According to this configuration, it is possible to obtain an optical system 2 that is thin and can easily ensure the accuracy of the stop position of the second lens group G2 during focusing. The details are as follows.

The above formula specifies the range of a ratio of the movement amount of the second lens group G2 when the second lens group G2 is moved in a direction of the optical axis C to the movement amount of an imaging position in the direction of the optical axis C due to the movement of the second lens group G2, and the ratio is obtained by using the calculation formula $((1-b2^2) \times b3^2)$ of the lateral magnification of the second lens group G2 when focusing at infinity and the lateral magnification of the third lens group G3 when focusing at infinity. When this ratio (the value of the calculation formula) is less than the lower limit value (1.00), the movement amount of the imaging position when the second lens group G2 moves in direction of the optical axis C is reduced (that is, becomes dull), so it is necessary to increase the movement amount of the second lens group G2 when focusing, and thus it becomes difficult to make the optical system 2 thinner. On the other hand, when the ratio (the value of the calculation formula) is greater than the upper limit value (1.70), the movement amount of the imaging position when the second lens group G2 moves in direction of the optical axis C becomes large (that is, becomes sensitive), so it is difficult to ensure the accuracy of the stop position of the second lens group G2 during focusing. Therefore, in the optical system 2 of the present embodiment, by setting the ratio of the movement amount of the second lens group G2 when the second lens group G2 moves in the direction of the optical axis C to the movement amount of the imaging position in the direction of the optical axis C due to the movement of the second lens group G2 as the range of the above formula, it is possible to achieve a balance between thinning and the difficulty in ensuring the accuracy of the stop position of the second lens group G2 during focusing.

In addition, in the optical system 2 of the present embodiment, the ratio (the value of the calculation formula) may satisfy:

$$1.10 \leq \left(1 - b2^2\right) \times b3^2 \leq 1.60$$

It may satisfy the following formula.

$$1.20 \leq \left(1 - b2^2\right) \times b3^2 \leq 1.50$$

In addition, in the optical system 2, when a refractive index of the at least one lens in the first lens group G1 on a d-line is nd1 and an Abbe number based on the d-line of the at least one lens in the first lens group G1 is vd1, it may be satisfied that the following formula.

$$1.50 \leq nd1 \leq 1.70 \text{ and } 15.00 \leq vd1 \leq 60.00$$

According to this configuration, the optical system 2 with wide angle, high performance and thin thickness may be obtained. The details are as follows.

The above-mentioned first formula $(1.50 \leq nd1 \leq 1.70)$ specifies the range of the refractive index (nd1) of the at least one lens in the first lens group G1 on the d-line. When the refractive index (nd1) is less than the lower limit value (1.50), the optical power of the first lens group G1 becomes weak, so it is difficult to achieve the wide angle. On the other hand, when the refractive index (nd1) is greater than the upper limit (1.70), the performance degradation becomes remarkable due to manufacturing errors, so it becomes difficult to achieve high performance. Therefore, in the optical system 2 of the present embodiment, by setting the refractive index (nd1) of the at least one lens in the first lens group G1 on the d-line as the first formula (1.50≤nd1≤1.70), the balance between wide-angle and high performance may be achieved.

In addition, in the optical system 2 of the present embodiment, the refractive index (nd1) may satisfy:

$$1.54 \leqslant nd1 \leqslant 1.69$$

It may satisfy the following formula.

$$1.57 \leqslant nd1 \leqslant 1.68$$

In addition, the above-mentioned second formula (15.00≤vd1≤60.00) specifies the range of the Abbe number (vd1) based on the d-line of the at least one lens in the first lens group G1. When the Abbe number (vd1) is less than the lower limit value (15.00), the number of lenses is increased to correct axial chromatic aberration and magnification chromatic aberration of the first lens group G1, so that thinning of the optical system 2 becomes difficult. On the other hand, when the Abbe number (vd1) is greater than the upper limit value (60.00), it is difficult to adjust the balance with other groups for chromatic aberration correction, so it is difficult to achieve high performance. Therefore, in the optical system 2 of the present embodiment, by setting the Abbe number based on the d-line of the at least one lens in the first lens group G1 as the above-mentioned second formula (15.00≤vd1≤60.00), the balance between thinness and high performance may be achieved.

In the optical system 2 of the present embodiment, the Abbe number (vd1) may satisfy the following formula.

$$18.00 \leqslant vd1 \leqslant 57.00$$

It may satisfy the following formula.

$$19.00 \leqslant vd1 \leqslant 38.00$$

In addition, in the optical system 2, when a refractive index of the at least one lens in the third lens group G3 on a d-line is nd3 and an Abbe number based on the d-line of the at least one lens in the third lens group G3 is vd3, it can satisfy the following formula.

$$1.50 \leqslant nd3 \leqslant 1.70 \text{ and } 15.00 \leqslant vd3 \leqslant 60.00.$$

According to this configuration, the optical system 2 with wide angle, high performance and thin thickness may be obtained. The details are as follows.

The above-mentioned first formula (1.50≤nd3≤1.70) specifies the range of the refractive index (nd3) of the at least one lens in the third lens group GB on the d-line. When the refractive index (nd3) is less than the lower limit (1.50), the focal power of the third lens group G3 becomes weak, so it becomes difficult to achieve the wide angle. On the other hand, when the refractive index (nd3) is greater than the upper limit value (1.70), the performance degradation becomes remarkable due to manufacturing errors, and it becomes difficult to achieve high performance. Therefore, in the optical system 2 of the present embodiment, by setting the refractive index (nd3) of the at least one lens in the third lens group G3 on the d-line as the first formula (1.50≤nd3≤1.70), the balance between wide-angle and high performance may be achieved.

In addition, in the optical system 2 of the present embodiment, the refractive index (nd3) may satisfy the following formula.

$$1.54 \leqslant nd3 \leqslant 1.69$$

It may satisfy the following formula.

$$1.57 \leqslant nd3 \leqslant 1.68.$$

In addition, the above-mentioned second formula (15.00≤vd3≤60.00) specifies the range of the Abbe number (vd3) based on the d-line of the at least one lens in the third lens group G3. When the Abbe number (vd3) is less than the lower limit value (15.00), the number of lenses is increased to correct the axial chromatic aberration and magnification chromatic aberration of the third lens group G3. Therefore, thinning of the optical system 2 becomes difficult. On the other hand, when the Abbe number (vd3) is greater than the upper limit value (60.00), it is difficult to adjust the balance with other groups for chromatic aberration correction, so it is difficult to achieve high performance. Therefore, in the optical system 2 of the present embodiment, the range of the Abbe number (vd3) based on the d-line of the at least one lens in the third lens group G3 is set as the above-mentioned second formula (15.00≤vd3≤60.00), so that the balance between thinness and high performance may be achieved.

In addition, in the optical system 2 of the present embodiment, the Abbe number (vd3) may satisfy the following formula.

$$18.00 \leqslant vd3 \leqslant 57.00$$

It may satisfy the following formula.

$$19.00 \leqslant vd3 \leqslant 38.00$$

In addition, in the optical system 2, at least the first lens group G1 among the first lens group G1, the second lens group G2, and the third lens group G3 is configured to be movable towards the image side when not photographing.

Therefore, when non-photographing, at least the first lens group G1 (the first lens group G1 and the second lens group G2 in the optical system 2 of the present embodiment) may be moved to the photographing element (imaging plane) 3, and further thinning may be achieved. In addition, the optical system 2 is arranged in the camera device 1, and at least the first lens group G1 is moved to the photographing element (imaging plane) 3 when non-photographing, so that the entire optical system 2 is accommodated in the camera device body 10 (i.e., retracted), thereby realizing the thinning of the camera device 1.

According to the camera device 1 configured as described above, it is possible to achieve sufficient wide angle and thinness.

Embodiments 1 to 4 of the optical system of the present disclosure will be described. In the following embodiments, the same reference numerals are used for structures corresponding to the components of the optical system 2 of the above embodiments. In addition, in the tables of the following embodiments, r is a radius of curvature, d is a lens thickness or lens spacing, nd is a refractive index of the d-line, and vd represents an Abbe number based on the d-line. In addition, an aspheric surface is defined by the following formula 1.

$$z = ch^2/\left[1 + \{1 - (1+k)c^2h^2\}^{1/2}\right] + A4h^4 + A6h^6 + A8h^8 + A10h^{10}$$ Formula 1

(Where, c is a curvature (1/r), h is a height (distance) from the optical axis, k is a conic coefficient, and A4, A6, A8 and A10 are aspheric coefficients of each order).

In addition, each longitudinal aberration diagram shows spherical aberration (SA (mm)), astigmatism (AST (mm)) and distortion (DIS (%)) in turn from the left. In the spherical aberration diagram, the vertical axis represents the F number (represented by FNO in the diagram, the solid-line represents the characteristics of the d-line, the short dashed-line represents the characteristics of F-line, and the long dashed-line represents the characteristics of C-line. In the astigmatism diagram, the vertical axis represents the maximum image height (represented by Y in the diagram), the solid-line represents the characteristics of the sagittal plane (represented by S in the diagram), and the dashed-line represents the characteristics of the meridian plane (represtructures of the optical system 2 of the above embodiments. In addition, in this optical system, when focusing, the positions of the first lens group and the third lens group on the optical axis C are fixed with respect to the photographing element (imaging plane).

Figure 5:
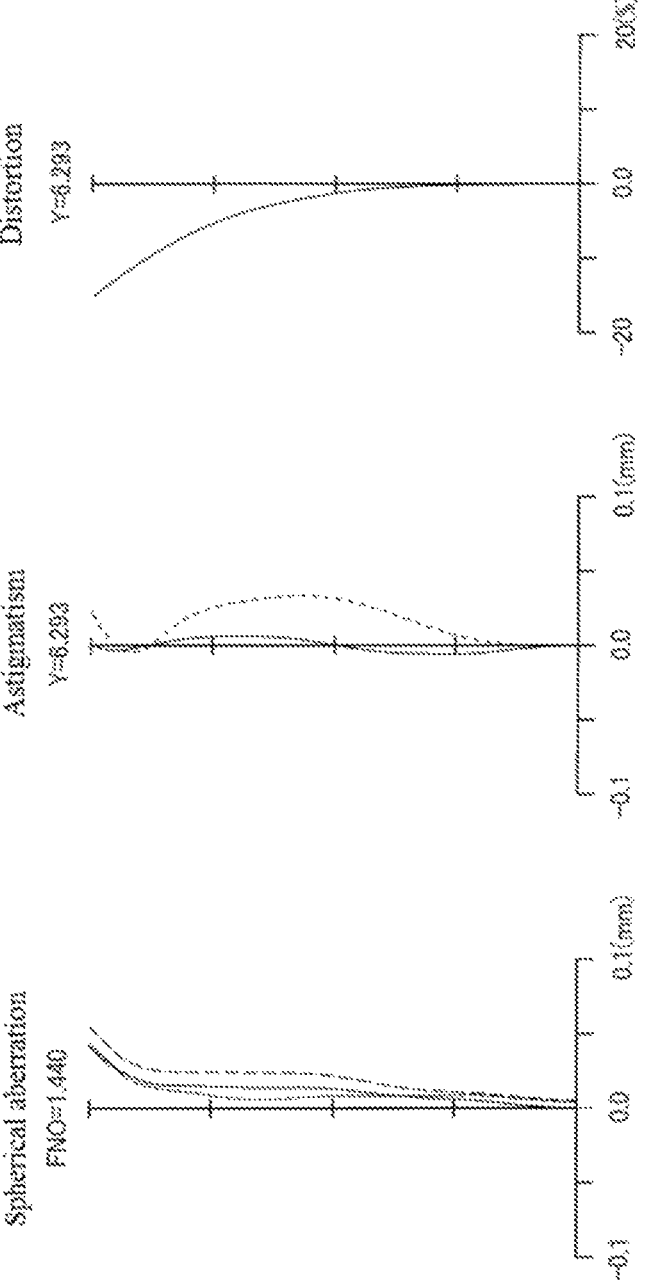
FIG. 5 is a longitudinal aberration diagram of an optical system according to embodiment 1 in an infinity focus state.
Figure 6:
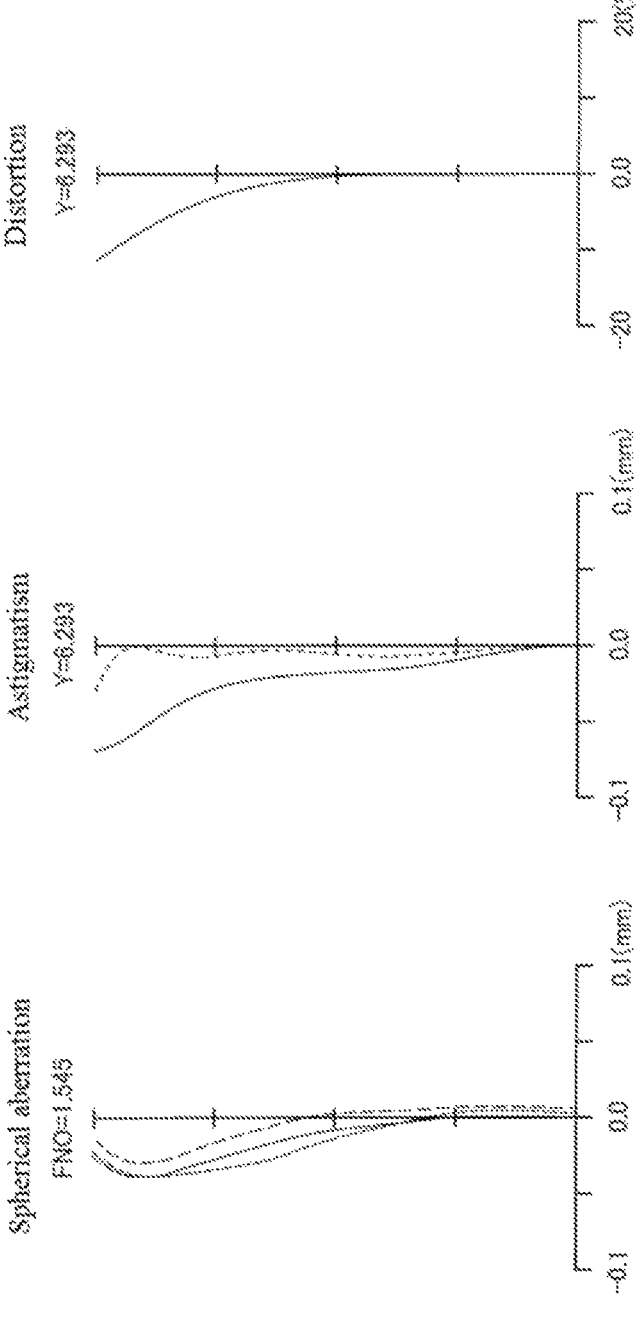
FIG. 6 is a longitudinal aberration diagram of an optical system according to embodiment 1 in a closest focus state.

In addition, FIG. 5 is a longitudinal aberration diagram in an infinity focus state, and FIG. 6 is a longitudinal aberration diagram in a closest focus state. Table 1 below shows the surface data of each lens, Table 2 shows the aspheric surface data, Table 3 shows various data, and Table 4 shows the lens group data.

TABLE 1

| Surface data | | | | |
| --- | --- | --- | --- | --- |
| Surface number | r | d | nd | vd |
| 1* | 19.169 | 0.500 | 1.5731 | 37.65 |
| 2* | 8.520 | 0.398 | | |
| 3 | ∞ | d3 | | (Aperture diaphragm) |
| 4* | 7.134 | 1.051 | 1.5445 | 55.96 |
| 5* | −30.682 | 0.100 | | |
| 6* | 45.330 | 1.512 | 1.5445 | 55.96 |
| 7* | −9.064 | 0.100 | | |
| 8* | 4.372 | 0.500 | 1.6714 | 19.27 |
| 9* | 2.742 | 1.037 | | |
| 10* | 41.560 | 1.455 | 1.5445 | 55.96 |
| 11* | −6.627 | d11 | | |
| 12* | −4.298 | 0.847 | 1.5731 | 37.65 |
| 13* | −59.840 | 0.400 | | |
| 14 | ∞ | 0.300 | 1.5168 | 64.20 |
| 15 | ∞ | 0.100 | | |

*Aspheric surface

TABLE 2

| | Aspheric surface data (the aspheric surface coefficient not shown is 0.00.) | | | | | | |
| --- | --- | --- | --- | --- | --- | --- | --- |
| Surface number | k | A4 | A6 | A8 | A10 | A12 | A14 |
| 1 | −1.1586E+00 | −5.5876E−03 | 4.4697E−04 | −2.7330E−05 | 2.1825E−06 | −1.7004E−07 | 6.0908E−09 |
| 2 | −4.2528E+00 | −5.0123E−03 | 4.6536E−04 | −2.3864E−05 | 1.4448E−05 | −1.3286E−07 | 5.9811E−09 |
| 4 | −1.9365E+00 | −1.5627E−03 | −7.2714E−05 | −4.4008E−05 | 9.7724E−06 | −8.5984E−07 | 2.0636E−08 |
| 5 | 2.4265E+00 | 1.7338E−03 | −2.1111E−04 | −1.3936E−05 | 7.8140E−06 | −8.8163E−07 | 2.6859E−08 |
| 6 | 5.0000E+00 | 4.9172E−03 | −2.9465E−04 | 5.9184E−05 | −8.2351E−06 | 5.3718E−07 | −1.3250E−08 |
| 7 | −4.3458E+00 | 5.4900E−03 | −3.5566E−04 | −6.3111E−05 | 8.5993E−06 | −3.0182E−07 | 1.3612E−09 |
| 8 | −4.9262E+00 | −1.2412E−02 | 3.4091E−03 | −6.2323E−04 | 6.0770E−05 | −2.9061E−06 | 5.4234E−08 |
| 9 | −3.7652E+00 | −9.0259E−03 | 2.8991E−03 | −5.0873E−04 | 4.9853E−05 | −2.4100E−06 | 4.5431E−08 |
| 10 | 5.0000E+00 | 1.1770E−03 | −4.4454E−04 | 1.0828E−04 | −1.4547E−05 | 1.0388E−06 | −2.7196E−08 |
| 11 | −4.4766E+00 | −3.8914E−04 | −7.6853E−05 | 1.4970E−05 | −6.1329E−07 | −3.2496E−08 | 5.4995E−09 |
| 12 | −2.5000E−01 | 3.9710E−03 | −5.8365E−04 | 5.2662E−05 | −2.4733E−06 | 6.3467E−08 | −6.3348E−10 |
| 13 | 7.2533E−01 | 3.6549E−03 | −5.3635E−04 | 3.5572E−05 | −1.3998E−06 | 2.8860E−08 | −2.4466E−10 | sented by M in the diagram). In the distortion diagram, the vertical axis represents the maximum image height (represented by Y in the diagram).

Embodiment 1

Figure 3:
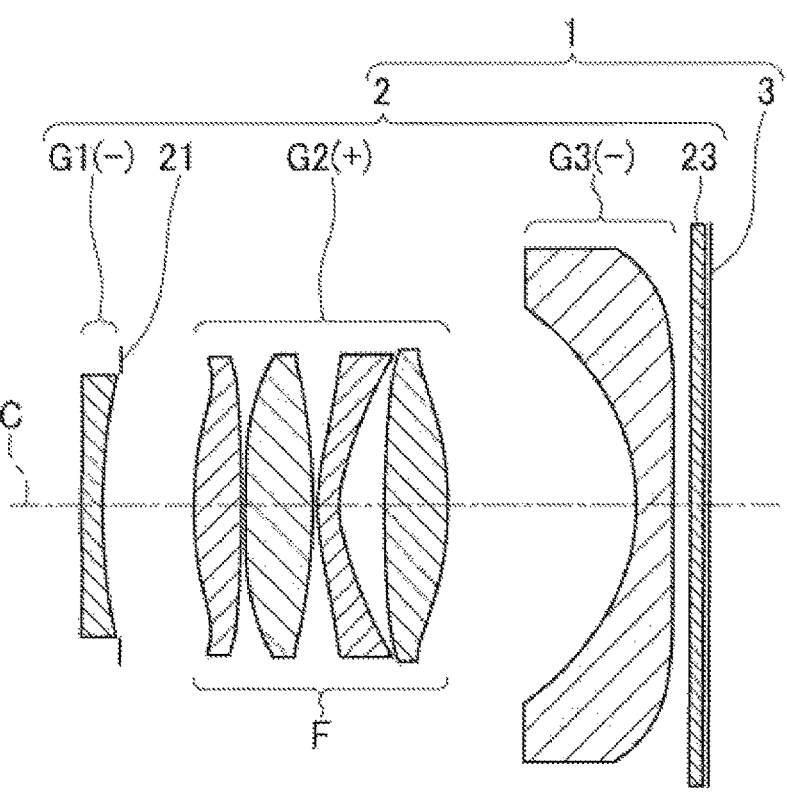
FIG. 3 is a lens structure diagram of an optical system according to embodiment 1 in an infinity focus state.
Figure 4:
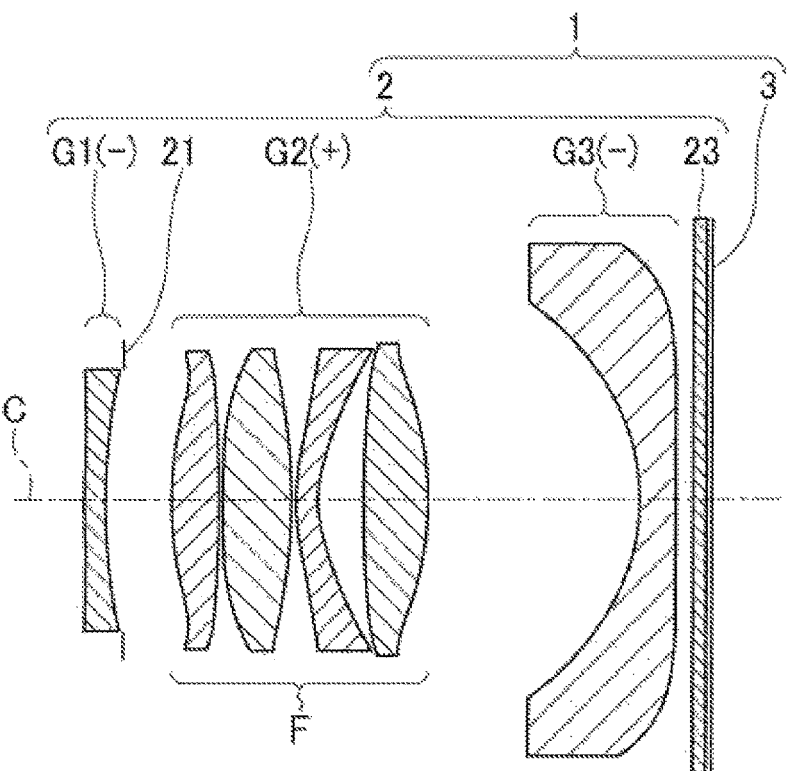
FIG. 4 is a lens structure diagram of an optical system according to embodiment 1 in a closest focus state.

FIGS. 3 and 4 are lens structure diagrams of the optical system of Embodiment 1, with FIG. 3 showing an infinity focus state and FIG. 4 showing a closest focus state. In addition, the reference numerals indicating the structures of the optical system are the same as those of the corresponding

TABLE 3

| Various data | | |
| --- | --- | --- |
| Object Distance | ∞ | 100.000 |
| F Number | 1.440 | 1.545 |
| Semi-visual | 41.111 | 37.996 |
| Lens total length | 14.163 | 14.163 |
| d3 | 1.660 | 1.064 |
| d11 | 4.203 | 4.799 |

The focal length is 8.480, and the maximum image height is 6.293.

TABLE 4

| | | | Lens Group Data | | |
|---|---|---|---|---|---|
| Group | Starting surface | focal length | lens configuration length | lens movement amount | magni-fication |
| 1 | 1 | −27.226 | 0.898 | 0.000 | 0.000 |
| 2 | 4 | 6.571 | 5.755 | 0.596 | −0.269 |
| 3 | 12 | −8.125 | 0.847 | 0.000 | 1.156 |

Embodiment 2

Figure 7:
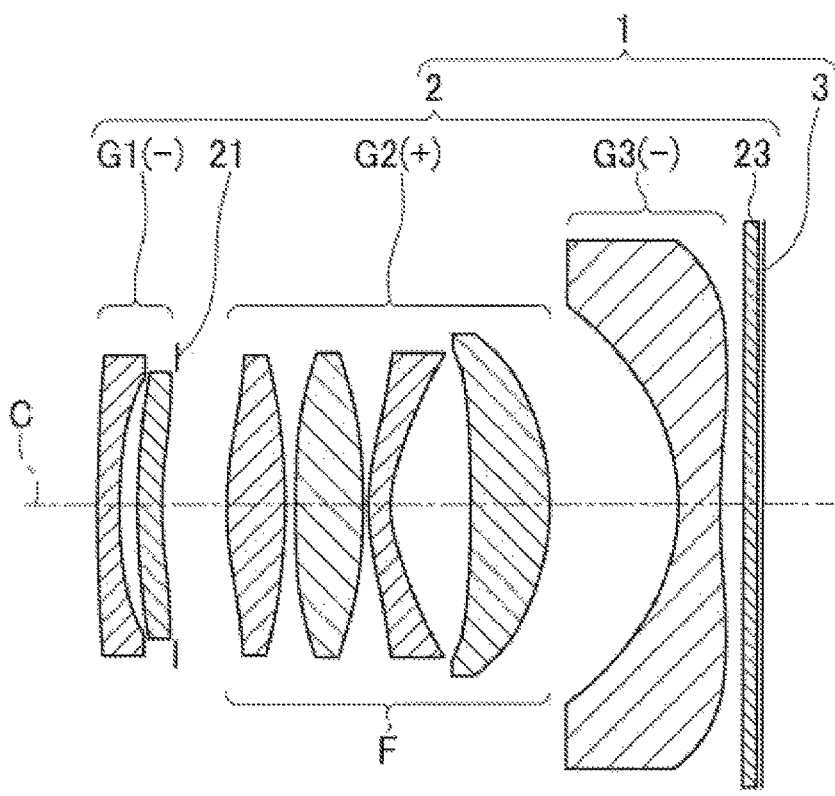
FIG. 7 is a lens structure diagram of an optical system according to embodiment 2 in an infinity focus state.
Figure 8:
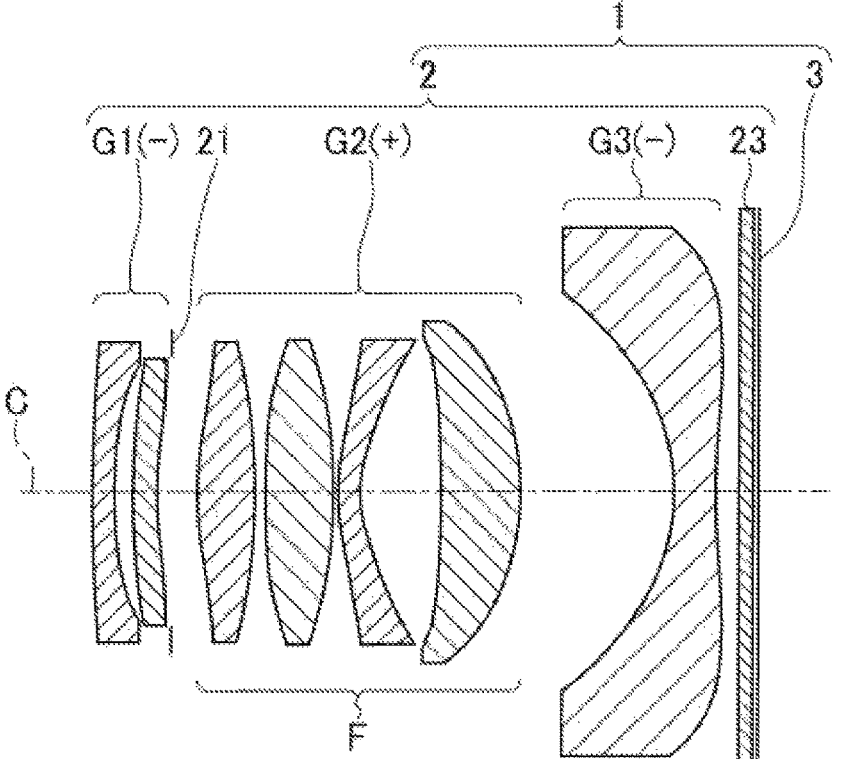
FIG. 8 is a lens structure diagram of an optical system according to embodiment 2 in a closest focus state.

FIGS. 7 and 8 are lens structure diagrams of the optical system of the Embodiment 2, with FIG. 7 showing an infinity focus state and FIG. 8 showing a closest focus state.

In addition, the reference numerals indicating the respective structures of the optical system are the same as those of the corresponding structures of the optical system 2 of the above embodiments. In addition, in this optical system, when focusing, the positions of the first lens group and the third lens group on the optical axis are also fixed relative to the photographing element (imaging plane).

Figure 9:
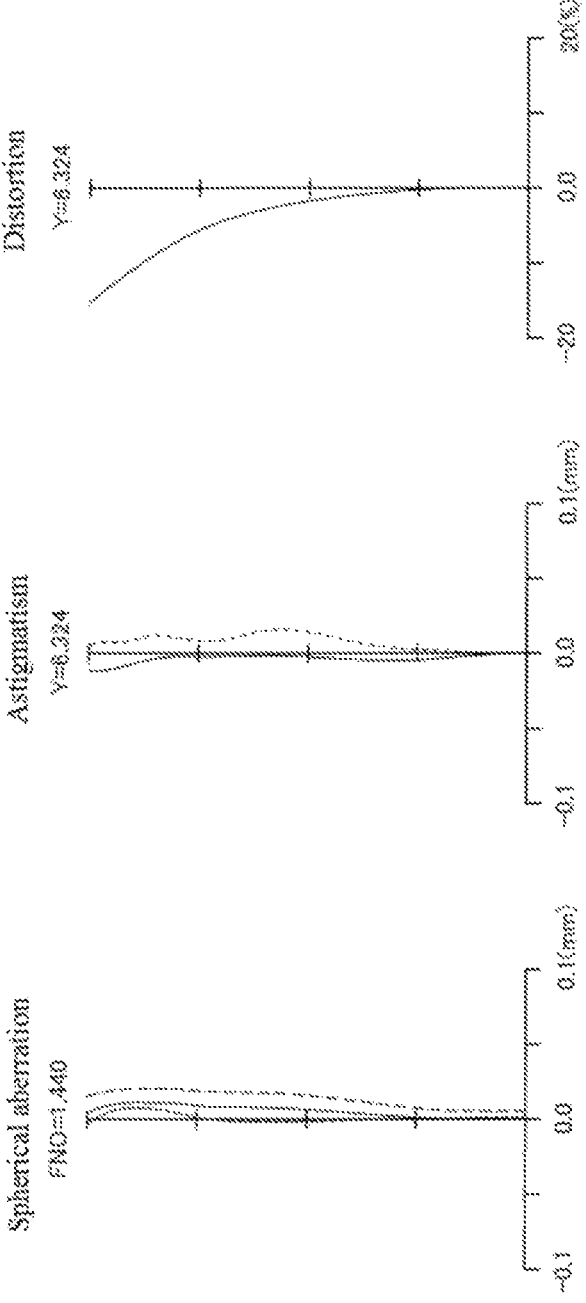
FIG. 9 is a longitudinal aberration diagram of an optical system according to embodiment 2 in an infinity focus state.
Figure 10:
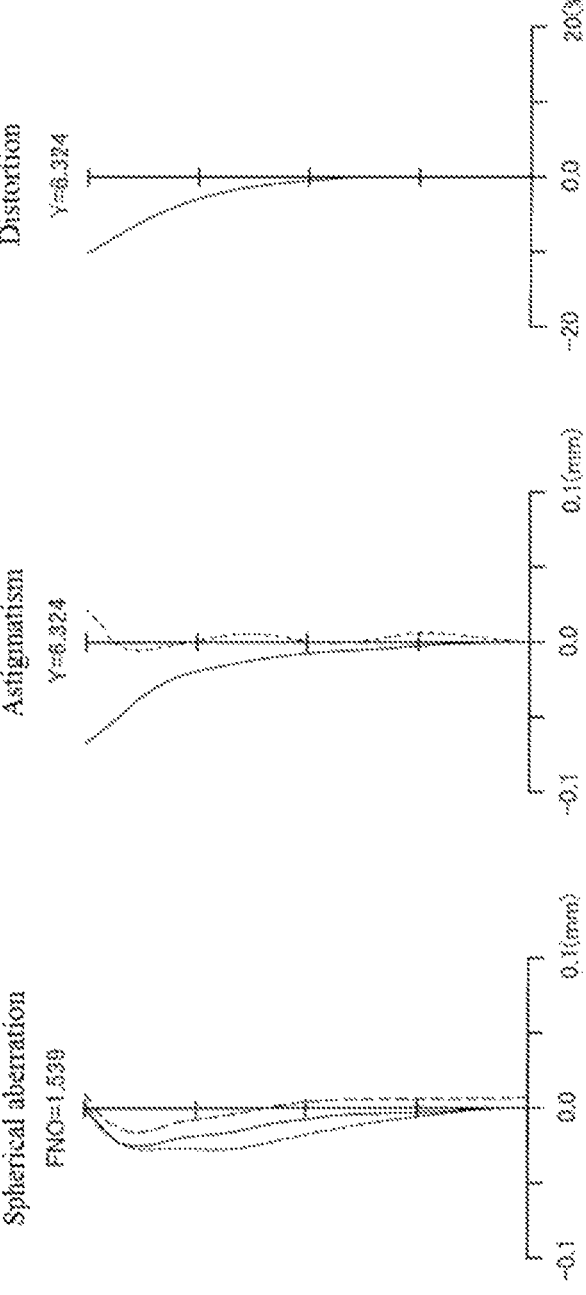
FIG. 10 is a longitudinal aberration diagram of an optical system according to embodiment 2 in a closest focus state.

In addition, FIG. 9 is a longitudinal aberration diagram in an infinity focus state, and FIG. 10 is a longitudinal aberration diagram in a closest focus state. Table 5 below shows the surface data of each lens, table 6 shows aspherical surface data, table 7 shows various data, and table 8 shows lens group data.

TABLE 5

| | | Surface data | | |
|---|---|---|---|---|
| Surface | r | d | nd | vd |
| 1* | 100.000 | 0.500 | 1.5731 | 37.65 |
| 2* | 14.838 | 0.416 | | |
| 3* | 10.417 | 0.532 | 1.5445 | 55.96 |
| 4* | 7.669 | 0.315 | | |
| 5 | ∞ | d5 | | (Aperture diaphragm) |
| 6* | 8.588 | 1.335 | 1.5445 | 55.96 |
| 7* | −10.522 | 0.211 | | |
| 8* | 30.812 | 1.538 | 1.5445 | 55.96 |

TABLE 5-continued

| | | Surface data | | |
|---|---|---|---|---|
| Surface | r | d | nd | vd |
| 9* | −8.191 | 0.100 | | |
| 10* | 5.114 | 0.516 | 1.6714 | 19.27 |
| 11* | 3.092 | 1.799 | | |
| 12* | −61.079 | 1.791 | 1.5445 | 55.96 |
| 13* | −5.480 | d13 | | |
| 14* | −5.139 | 1.011 | 1.5880 | 28.42 |
| 15* | 16.915 | 0.536 | | |
| 16 | ∞ | 0.300 | 1.5168 | 64.20 |
| 17 | ∞ | 0.100 | | |

*Aspheric surface

TABLE 6

| | | | Aspheric surface data (the aspheric surface coefficient not shown is 0.00.) | | | | |
|---|---|---|---|---|---|---|---|
| Surface | k | A4 | A6 | A8 | A10 | A12 | A14 |
| 1 | 4.2387E+00 | 3.1255E−03 | −2.5133E−04 | 9.7269E−06 | −8.3840E−07 | 2.4038E−08 | 6.5646E−10 |
| 2 | −5.0000E+00 | 4.4063E−03 | 1.0551E−04 | −4.0100E−05 | 6.7225E−06 | −5.5275E−07 | 1.8124E−08 |
| 3 | −1.1315E+00 | −6.9101E−03 | 1.0972E−03 | −1.3638E−04 | 1.4479E−05 | −8.3125E−07 | 1.4330E−09 |
| 4 | −4.6493E+00 | −6.9923E−03 | 8.4000E−04 | −1.0048E−04 | 8.0469E−06 | −3.3810E−07 | −7.2023E−10 |
| 6 | −4.1600E−01 | −1.6583E−03 | 3.1014E−05 | −5.7996E−06 | −2.2849E−06 | 3.5455E−07 | −1.5614E−08 |
| 7 | −1.3990E+00 | 2.4240E−03 | −2.1205E−05 | −6.5868E−05 | 7.5935E−05 | −2.3869E−07 | −2.5467E−09 |
| 8 | 5.0000E+00 | 4.0591E−03 | 8.0300E−05 | −8.3422E−05 | 9.5359E−06 | −4.2011E−07 | 6.3488E−09 |
| 9 | −3.6987E+00 | 4.1549E−03 | −4.2860E−04 | −2.2887E−05 | 4.6027E−06 | −1.5917E−07 | 9.3609E−10 |
| 10 | −5.0000E+00 | −7.6039E−03 | 1.8865E−03 | −4.0547E−04 | 4.5147E−05 | −2.4114E−06 | 4.9806E−08 |
| 11 | −4.4825E+00 | −2.2811E−03 | 1.1687E−03 | −2.6576E−04 | 3.1291E−05 | −1.7577E−06 | 3.8466E−08 |
| 12 | 5.0000E+00 | −9.4497E−04 | −4.0865E−05 | −5.9764E−06 | 1.1607E−06 | −1.4624E−07 | 5.1378E−09 |
| 13 | −1.5118E+00 | −6.4670E−04 | −1.0703E−04 | 5.5244E−06 | −4.3795E−07 | 8.4045E−09 | −5.0419E−10 |
| 14 | −3.4710E−01 | −9.5121E−04 | −1.4283E−04 | 3.1360E−05 | −2.4843E−06 | 9.7034E−08 | −1.5456E−09 |
| 15 | −1.6522E+00 | −1.1185E−03 | −1.4035E−04 | 1.6116E−05 | −7.8232E−07 | 1.7052E−08 | −1.4223E−10 |

TABLE 7

| | Various data | |
|---|---|---|
| Object distance | ∞ | 100.000 |
| F Number | 1.440 | 1.539 |
| Semi-visual | 41.993 | 38.595 |
| Lens total length | 15.000 | 15.000 |
| d5 | 1.154 | 0.583 |
| d13 | 2.846 | 3.417 |

The focal length is 8.264 and the maximum image height is 6.324.

TABLE 8

| | | | Lens Group Data | | |
|---|---|---|---|---|---|
| group | starting surface | focal length | lens configuration length | lens movement amount | magni-fication |
| 1 | 1 | −19.499 | 1.763 | 0.000 | 0.000 |
| 2 | 6 | 6.278 | 7.290 | 0.571 | −0.354 |
| 3 | 14 | −6.591 | 1.011 | 0.000 | 1.198 |

Embodiment 3

Figure 11:
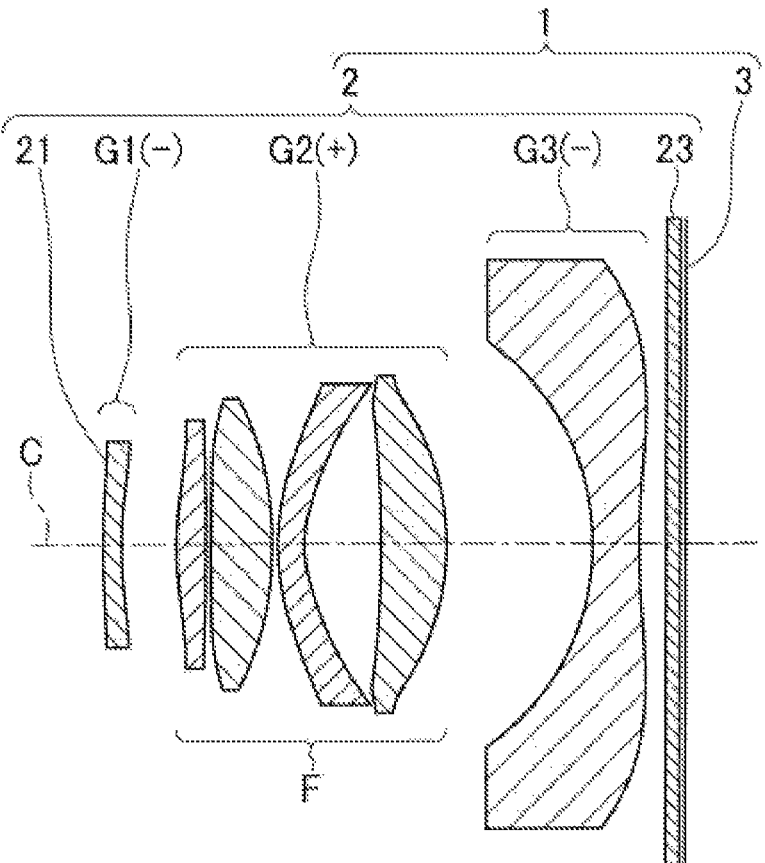
FIG. 11 is a lens structure diagram of an optical system according to embodiment 3 in an infinity focus state.
Figure 12:
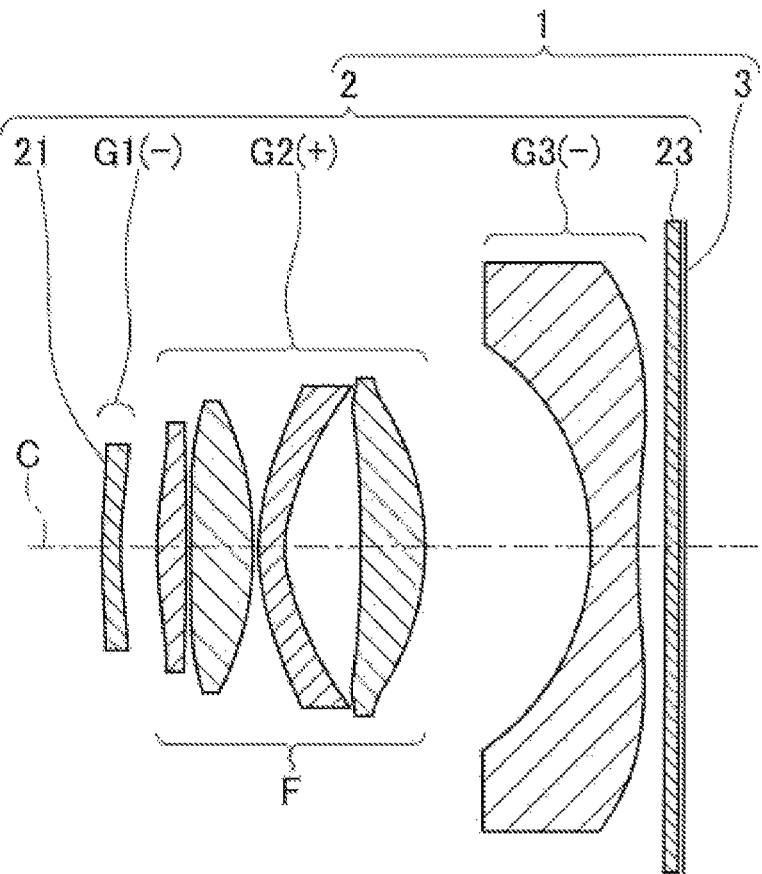
FIG. 12 is a lens structure diagram of an optical system according to embodiment 3 in a closest focus state.

FIGS. 11 and 12 are lens structure diagrams of the optical system of Embodiment 3, with FIG. 11 showing an infinity focus state and FIG. 12 showing a closest focus state. In addition, the reference numerals indicating the respective structures of the optical system are the same as those of the corresponding structures of the optical system 2 of the above embodiments. In addition, in this optical system, when focusing, the positions of the first lens group and the third lens group on the optical axis are also fixed relative to the photographing element (imaging plane).

Figure 13:
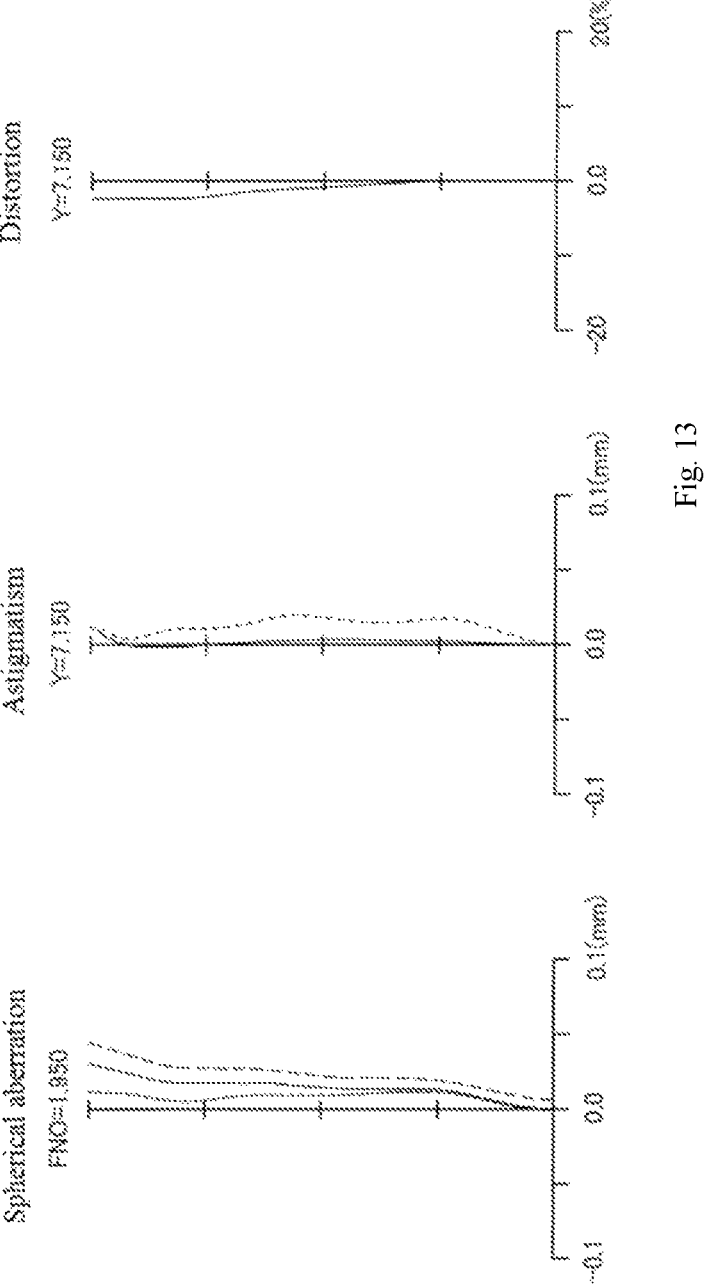
FIG. 13 is a longitudinal aberration diagram of an optical system according to embodiment 3 in an infinity focus state.
Figure 14:
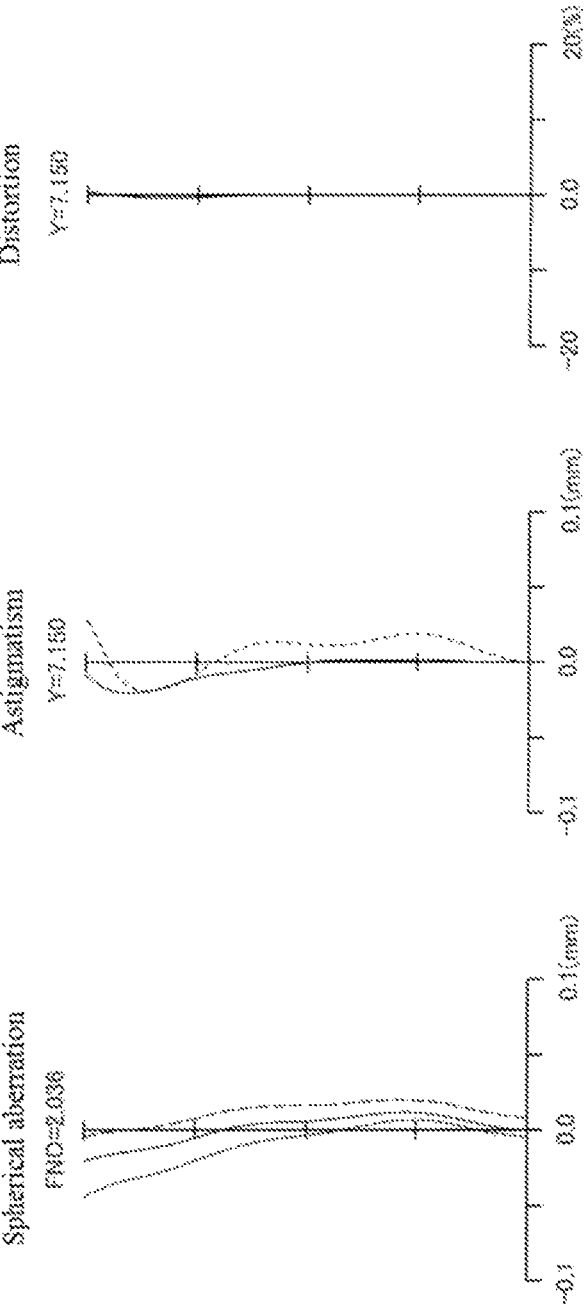
FIG. 14 is a longitudinal aberration diagram of an optical system according to embodiment 3 in a closest focus state.

In addition, FIG. 13 is a longitudinal aberration diagram in an infinity focus state, FIG. 14 is a longitudinal aberration diagram in a closest focus state, and the following table 9 shows the surface data of each lens, table 10 shows the aspheric surface data, table 11 shows various data, and table 12 shows the lens group data.

TABLE 9

| | | Surface data | | | |
|---|---|---|---|---|---|
| Surface | r | d | nd | vd | |
| 1* | 11.315 | 0.400 | 1.6714 | 19.27 | (Aperture |
| 2* | 7.991 | d2 | | | diaphragm) |
| 3* | 8.664 | 0.633 | 1.5445 | 55.96 | |
| 4* | −108.143 | 0.108 | | | |
| 5* | −83.676 | 1.365 | 1.5445 | 55.96 | |
| 6* | −5.866 | 0.100 | | | |
| 7* | 3.991 | 0.598 | 1.6714 | 19.27 | |
| 8* | 2.805 | 1.671 | | | |
| 9* | −34.161 | 1.435 | 1.5445 | 55.96 | |
| 10* | −5.123 | d10 | | | |
| 11* | −6.400 | 1.040 | 1.6362 | 23.91 | |
| 12* | 13.389 | 0.550 | | | |
| 13 | ∞ | 0.300 | 1.5168 | 64.20 | |
| 14 | ∞ | 0.100 | | | |

TABLE 10

Aspheric surface data (the aspheric surface coefficient not shown is 0.00.)

| Surface number | k | A4 | A6 | A8 | A10 |
|---|---|---|---|---|---|
| 1 | −3.0982E+00 | −6.4010E−03 | 1.1554E−03 | −1.1620E−03 | 8.7617E−04 |
| 2 | −4.1964E+00 | −5.7829E−03 | 1.1054E−03 | −1.0608E−03 | 7.9224E−04 |
| 3 | −5.0000E+00 | −2.2605E−03 | 6.9314E−04 | −6.8858E−04 | 2.8175E−04 |
| 4 | −5.0000E+00 | −7.5169E−04 | 2.5740E−03 | −1.8578E−03 | 6.0127E−04 |
| 5 | −5.0000E+00 | 3.8419E−03 | 1.9481E−03 | −1.6494E−03 | 5.6884E−04 |
| 6 | −1.1242E+00 | 7.8405E−03 | −1.4660E−03 | 8.8678E−05 | 2.3197E−06 |
| 7 | −3.3310E+00 | −6.6354E−03 | 2.4817E−03 | −7.3398E−04 | 1.5125E−04 |
| 8 | −3.0386E+00 | −9.0958E−03 | 4.2016E−03 | −1.1990E−03 | 2.4083E−04 |
| 9 | −5.0000E+00 | −5.3728E−04 | −2.9357E−04 | 1.1403E−04 | −3.0263E−05 |
| 10 | −2.0315E+00 | −5.5111E−04 | −1.9327E−04 | 4.0264E−05 | −4.6925E−06 |
| 11 | 8.4798E−01 | −1.6814E−03 | 4.2208E−05 | −1.1614E−05 | 5.8505E−06 |
| 12 | −1.3506E+00 | −2.7779E−03 | 1.0682E−04 | −1.4227E−05 | 1.8884E−06 |

| Surface number | A12 | A14 | A16 | A18 | A20 |
|---|---|---|---|---|---|
| 1 | −4.0305E−04 | 1.1418E−04 | −1.9393E−05 | 1.8046E−06 | −7.0445E−08 |
| 2 | −3.6017E−04 | 1.0039E−04 | −1.6693E−05 | 1.5107E−06 | −5.6813E−08 |
| 3 | −7.2878E−05 | 1.2523E−06 | −1.3851E−06 | 8.5617E−08 | −2.1804E−09 |
| 4 | −1.0391E−04 | 1.0478E−05 | −6.4738E−07 | 2.3144E−08 | −3.3981E−10 |
| 5 | −1.0634E−04 | 1.1777E−05 | −7.7840E−07 | 2.8440E−08 | −4.4111E−10 |
| 6 | 1.0260E−06 | −6.6506E−07 | 1.1390E−07 | −8.3798E−09 | 2.2825E−10 |
| 7 | −2.1402E−05 | 2.0528E−06 | −1.2699E−07 | 4.5297E−09 | −700218E−11 |
| 8 | −3.3728E−05 | 3.2362E−06 | −2.0161E−07 | 7.2779E−09 | −1.1461E−10 |
| 9 | 5.6635E−06 | −7.1542E−07 | 5.8606E−08 | −2.6841E−09 | 5.0765E−11 |
| 10 | 4.8586E−08 | 7.6440E−08 | −1.1459E−08 | 7.6176E−10 | −1.9396E−11 |
| 11 | −9.1782E−07 | 7.1720E−08 | −3.0242E−09 | 6.5249E−11 | −5.4655E−13 |
| 12 | −1.3981E−07 | 5.7990E−09 | −1.3676E−10 | 1.7249E−12 | −9.0780E−15 |

TABLE 11

| | Various data | | |
|---|---|---|---|
| Object distance | ∞ | 120.000 | |
| F Number | 1.950 | 2.036 | |
| Semi-visual | 40.999 | 39.061 | |
| Lens total length | 12.742 | 12.742 | |
| d2 | 1.219 | 0.783 | |
| d10 | 3.222 | 3.658 | |

The focal length is 8.417 and the maximum image height is 7.150.

TABLE 12

| | | | Lens Group Data | | |
|---|---|---|---|---|---|
| group | starting surface | focal length | lens configuration length | lens movement amount | magni-fication |
| 1 | 1 | −42.573 | 0.400 | 0.000 | 0.000 |
| 2 | 3 | 6.522 | 5.911 | 0.436 | −0.166 |
| 3 | 11 | −6.671 | 1.040 | 0.000 | 1.188 |

Embodiment 4

Figure 15:
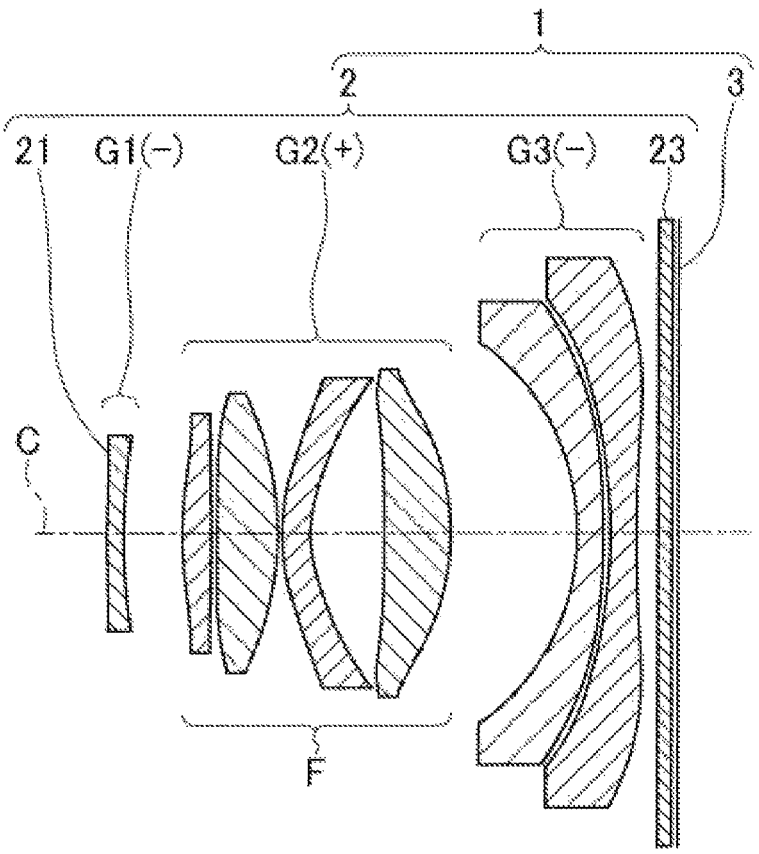
FIG. 15 is a lens structure diagram of an optical system according to embodiment 4 in an infinity focus state.
Figure 16:
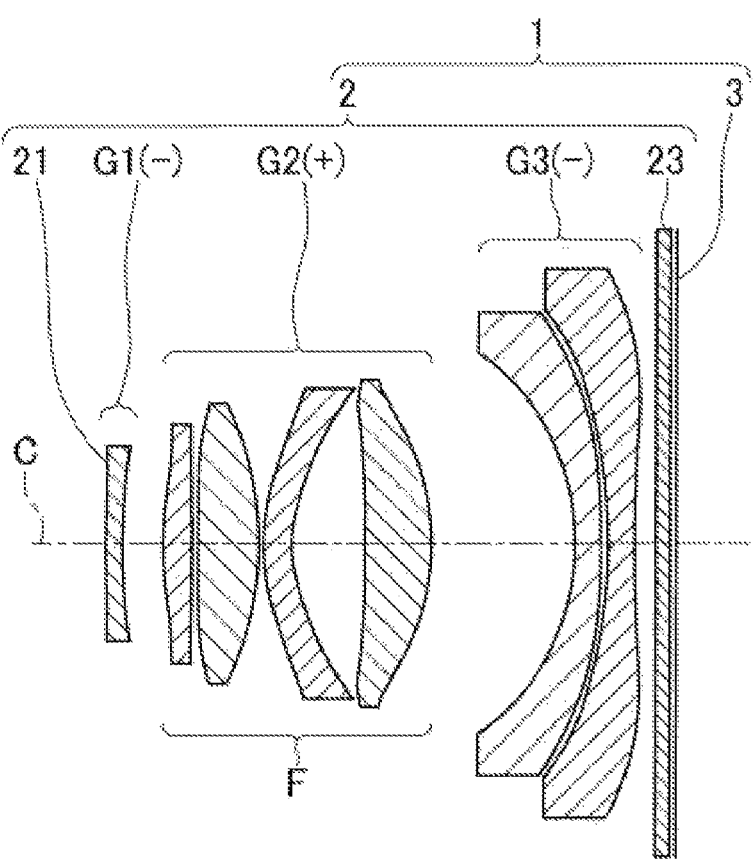
FIG. 16 is a lens structure diagram of an optical system according to embodiment 4 in a closest focus state.

FIGS. 15 and 16 are lens structure diagrams of the optical system of Embodiment 3, with FIG. 15 showing an infinity focus state and FIG. 16 showing a closest focus state. In addition, the reference numerals indicating the respective structures of the optical system are the same as those of the corresponding structures of the optical system 2 of the above embodiment. In addition, in this optical system, when focusing, the positions of the first lens group and the third lens group on the optical axis are also fixed relative to the photographing element (imaging plane).

Figure 17:
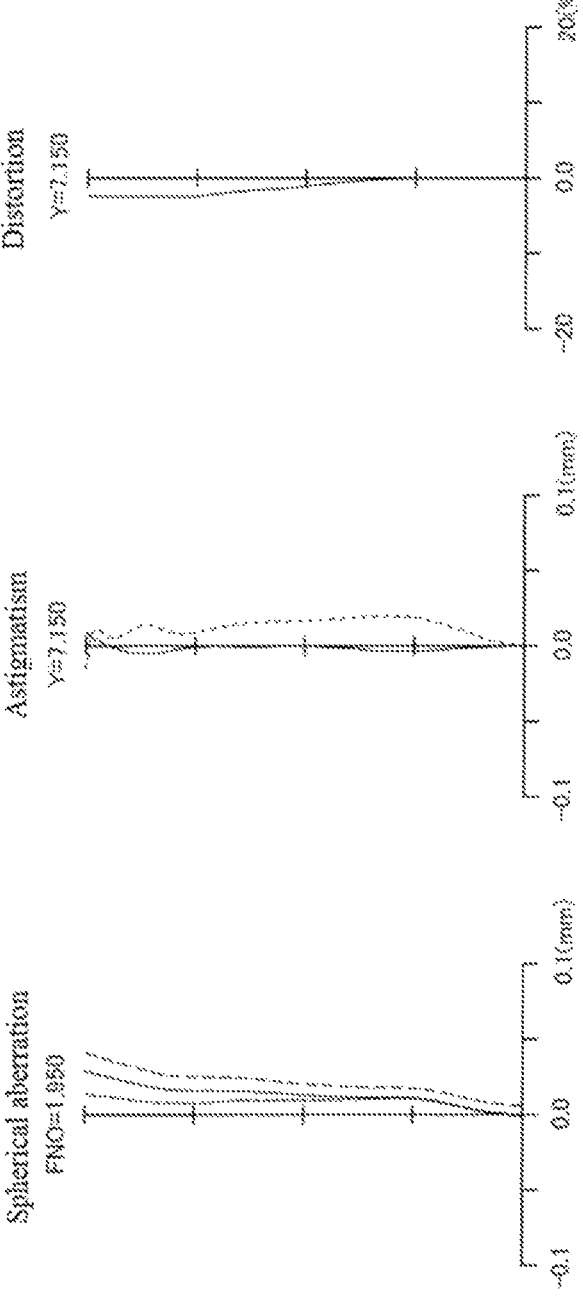
FIG. 17 is a longitudinal aberration diagram of an optical system according to embodiment 4 in an infinity focus state.
Figure 18:
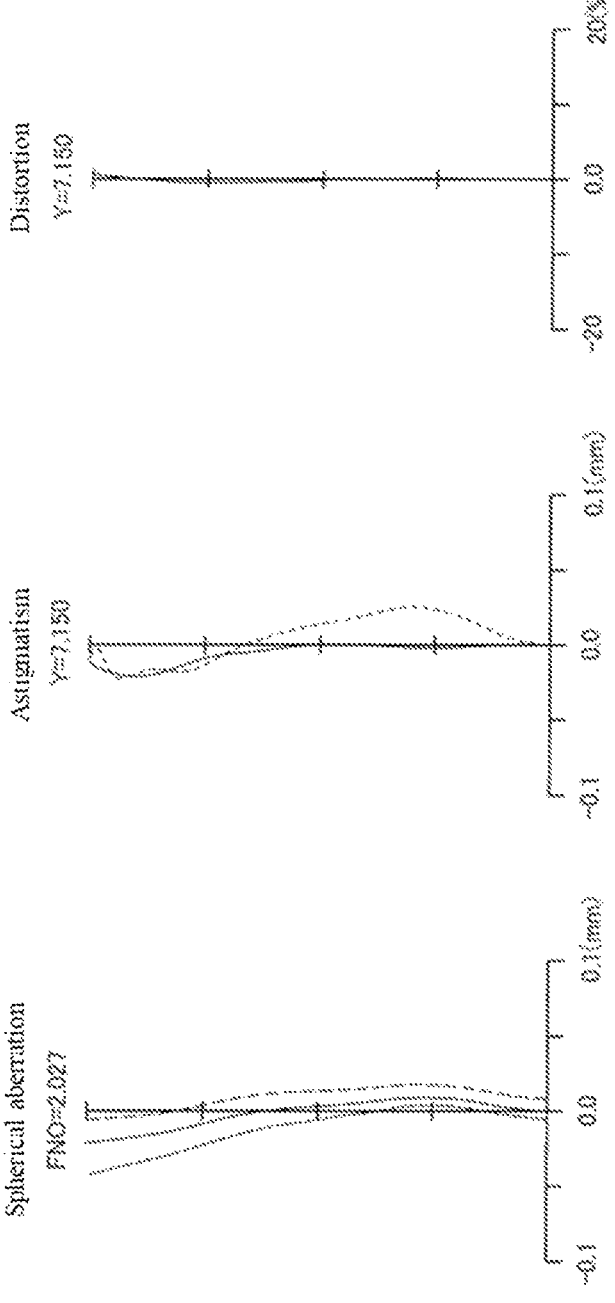
FIG. 18 is a longitudinal aberration diagram of an optical system according to embodiment 4 in a closest focus state.

In addition, FIG. 17 is a longitudinal aberration diagram in an infinity focus state, FIG. 18 is a longitudinal aberration diagram in a closest focus state, and the following table 13 shows the surface data of each lens, table 14 shows the aspheric surface data, table 15 shows various data, and table 16 shows the lens group data.

TABLE 13

| Surface data | | | | | |
|---|---|---|---|---|---|
| Surface number | r | d | nd | vd | |
| 1* | 12.754 | 0.402 | 1.6714 | 19.27 | (Aperture diaphragm) |
| 2* | 8.581 | d2 | | | |
| 3* | 8.521 | 0.654 | 1.5445 | 55.96 | |
| 4* | −146.190 | 0.137 | | | |
| 5* | −82.877 | 1.395 | 1.5445 | 55.96 | |
| 6* | −5.850 | 0.100 | | | |
| 7* | 4.008 | 0.616 | 1.6714 | 19.27 | |
| 8* | 2.857 | 1.722 | | | |
| 9* | −36.337 | 1.518 | 1.5445 | 55.96 | |
| 10* | −5.055 | d10 | | | |
| 11* | −6.578 | 0.600 | 1.6362 | 23.91 | |
| 12* | −40.621 | 0.174 | | | |
| 13* | −13.896 | 0.600 | 1.6714 | 19.27 | |
| 14* | 42.060 | 0.505 | | | |
| 15 | ∞ | 0.300 | 1.5168 | 64.20 | |
| 16 | ∞ | 0.100 | | | |

*Aspheric surface

TABLE 14

| Aspheric surface data (the aspheric surface coefficient not shown is 0.00 ) | | | | | |
|---|---|---|---|---|---|
| Surface number | k | A4 | A6 | A8 | A10 |
| 1 | −3.4291E+00 | −6.2486E−03 | 1.2240E−03 | −1.1964E−03 | 8.6985E−04 |
| 2 | −4.3483E+00 | −5.7023E−03 | 1.1465E−03 | −1.0054E−03 | 6.8853E−04 |
| 3 | −4.9363E+00 | −2.1327E−03 | 7.3476E−04 | −7.5010E−04 | 3.3431E−04 |
| 4 | 2.7915E+00 | −6.4394E−04 | 2.2208E−03 | −1.6390E−03 | 5.5723E−04 |
| 5 | −5.0000E+00 | 3.8010E−03 | 1.5188E−03 | −1.0308E−03 | 4.3194E−04 |
| 6 | −1.0556E+00 | 6.8458E−03 | −9.0100E−04 | −1.2156E−04 | 5.5409E−05 |
| 7 | −3.3370E+00 | −6.4170E−03 | 2.4886E−03 | −7.6084E−04 | 1.5894E−04 |
| 8 | −3.0078E+00 | −8.6193E−03 | 3.8960E−03 | −1.0927E−03 | 2.1520E−04 |
| 9 | −5.0000E+00 | −4.5061E−04 | −2.3349E−04 | 8.2181E−05 | −2.2315E−05 |
| 10 | −2.0609E+00 | −3.6558E−04 | −1.6987E−04 | 2.6567E−05 | −3.2584E−06 |
| 11 | 8.5984E−01 | −1.3169E−03 | 1.7459E−05 | −9.8362E−06 | −2.1775E−06 |
| 12 | −5.0000E+00 | −3.8241E−03 | 2.8920E−04 | −1.8226E−05 | −1.2253E−06 |
| 13 | 4.9994E+00 | 5.0343E−04 | −2.8974E−04 | 3.5062E−05 | −5.5649E−07 |
| 14 | −3.9529E+00 | 1.9734E−03 | −3.4948E−04 | 4.8260E−06 | 2.5849E−06 |

| Surface number | A12 | A14 | A16 | A18 | A20 |
|---|---|---|---|---|---|
| 1 | −3.8672E−04 | 1.0609E−04 | −1.7475E−05 | 1.5783E−06 | −5.9778E−08 |
| 2 | −2.8719E−04 | 7.3137E−05 | −1.1002E−05 | 8.8288E−07 | −2.8309E−08 |
| 3 | −9.4325E−05 | 1.7236E−05 | −1.9569E−06 | 1.2244E−07 | −3.1803E−09 |
| 4 | −1.0800E−04 | 1.3496E−05 | −1.1323E−06 | 5.7729E−08 | −1.3025E−09 |
| 5 | −7.6728E−05 | 8.0233E−06 | −4.9912E−07 | 1.7130E−08 | −2.4858E−10 |
| 6 | −7.9852E−06 | 4.0810E−07 | 2.4755E−08 | −3.8358E−09 | 1.2579E−10 |
| 7 | −2.2434E−05 | 2.1189E−06 | −1.2792E−07 | 4.4307E−09 | −6.6533E−11 |
| 8 | −2.9398E−05 | 2.7385E−06 | −1.6501E−07 | 5.7558E−09 | −8.7143E−11 |
| 9 | 4.2878E−06 | −5.3068E−07 | 4.1211E−08 | −1.7677E−09 | 3.1276E−11 |
| 10 | 1.4213E−07 | 3.6147E−08 | −6.4840E−09 | 4.4205E−10 | −1.0972E−11 |
| 11 | 8.6733E−07 | −9.2986E−08 | 4.5782E−09 | −1.0531E−10 | 8.7447E−13 |
| 12 | 3.3480E−07 | −2.4688E−08 | 8.5100E−10 | −1.3713E−11 | 7.8235E−14 |
| 13 | −2.4702E−07 | 2.5757E−08 | −1.1701E−09 | 2.2601E−11 | −2.3523E−13 |
| 14 | −2.6285E−07 | 1.2076E−08 | −2.9924E−10 | 3.8824E−12 | −2.0755E−14 |

TABLE 15

| Various data | | |
|---|---|---|
| Object distance | ∞ | 120.000 |
| F Number | 1.950 | 2.027 |
| Semi-visual | 40.996 | 39.132 |
| Lens total length | 13.040 | 13.040 |
| d2 | 1.359 | 0.945 |
| d10 | 2.858 | 3.272 |

The focal length is 8.419 and the maximum image height is 7.150.

TABLE 16

| Lens Group Data | | | | | |
|---|---|---|---|---|---|
| group | starting surface | focal length | lens configuration length | lens movement amount | magnification |
| 1 | 1 | −40.268 | 0.402 | 0.000 | 0.000 |
| 2 | 3 | 6.430 | 6.142 | 0.414 | −0.172 |
| 3 | 11 | −6.669 | 1.374 | 0.000 | 1.215 |

In the above Embodiments 1 to 4, the values corresponding to the conditions of the above embodiments are shown in the following Table 17.

In addition, in Table 17, conditional formula (1) is $f3/f$, conditional formula (2) is $b2$, conditional formula (3) is $OAL123/Y$, conditional formula (4) is $b3$, conditional formula (5) is $f2/f$, conditional formula (6) is $(1−b2)×b3$, and conditional formula (7) is $f1/f$, conditional formula (8) is $OAL/f$, conditional formula (9) is $(1−b2^2)×b3^2$, conditional formula (10) is nd1, conditional formula (11) is vd1, conditional formula (12) is nd3, and conditional formula (13) is vd3.

TABLE 17

Corresponding Values of Conditional Formula

| | Embodiment 1 | Embodiment 2 | Embodiment 3 | Embodiment 4 |
|---|---|---|---|---|
| Formula (1) | −0.958 | −0.798 | −0.793 | −0.792 |
| Formula (2 | −0.269 | −0.354 | −0.166 | −0.172 |
| Formula (3 | 1.192 | 1.592 | 1.028 | 1.107 |
| Formula (4) | 1.156 | 1.198 | 1.188 | 1.215 |
| Formula (5) | 0.775 | 0.760 | 0.775 | 0.764 |
| Formula (6) | 1.467 | 1.622 | 1.385 | 1.424 |
| Formula (7) | −3.211 | −2.360 | −5.058 | −4.783 |
| Formula (8) | 1.670 | 1.815 | 1.514 | 1.549 |
| Formula (9) | 1.240 | 1.255 | 1.372 | 1.433 |
| Formula (10) | 1.573 | 1.573 1.545 | 1.671 | 1.671 |
| Formula (11) | 37.650 | 37.650 55.960 | 19.270 | 19.270 |
| Formula (12) | 1.573 | 1.588 | 1.636 | 1.636 1.671 |
| Formula (13) | 37.650 | 28.420 | 23.910 | 23.910 19.270 |
| f | 8.480 | 8.264 | 8.417 | 8.419 |
| f1 | −27.226 | −19.499 | −42.573 | −40.268 |
| f2 | 6.571 | 6.278 | 6.522 | 6.430 |
| f3 | −8.125 | −6.591 | −6.671 | −6.669 |
| b2 | −0.269 | −0.354 | −0.166 | −0.172 |
| d3 | 1.156 | 1.198 | 1.188 | 1.215 |
| OAL123 | 7.500 | 10.064 | 7.350 | 7.918 |
| Y | 6.293 | 6.324 | 7.150 | 7.150 |
| OAL | 14.163 | 15.000 | 12.742 | 13.040 |
| Nd1 | 1.573 | 1.573 1.545 | 1.671 19.270 | 1.671 |
| vd1 | 37.650 | 37.650 55.960 | 1.636 | 19.270 |
| Nd3 | 1.573 | 1.588 | 1.636 | 1.636 1.671 |
| vd3 | 37.650 | 28.420 | 23.910 | 23.910 19.270 |

An optical system of the present disclosure has a first lens group including at least one lens and having a negative refractive power, a second lens group including at least one lens and having a positive refractive power and a third lens group including at least one lens and having a negative refractive power, sequentially from an object side to an image side; during focusing, distances between the first lens group and an imaging plane and between the third lens group and the imaging plane on an optical axis are fixed, and the second lens group moves along the optical axis; when a lateral magnification of the second lens group focusing at infinity is b2, a lateral magnification of the third lens group focusing at infinity is b3, a focal length of the entire optical system focusing at infinity is f, a focal length of the second lens group is f2, a focal length of the third lens group is f3, a total value of distances from a lens face closest to the object side to a lens face closest to the image side in each lens group is OAL123, and a maximum image height is Y, at least one of the following formulas (1) to (4) is satisfied:

$$-1.20 \leq f3/f \leq -0.10 \quad (1)$$

$$-0.40 \leq b2 \leq -0.06 \quad (2)$$

$$0.3 \leq OAL123/Y \leq 2.30 \text{ and } 1.00 \leq b3 \leq 1.30 \quad (3)$$

$$0.60 \leq f2/f \leq 0.90. \quad (4)$$

22

In the optical system, the second lens group is configured to be further movable in a direction orthogonal to the optical axis, and it is satisfied that: $1.00 \leq (1-b2) \times b3 \leq 1.90$.

In addition, in the optical system, when a focal length of the first lens group is f1, it is satisfied that: $-16.00 \leq f1/f \leq -1.80$.

In addition, the optical system has an aperture device capable of changing an aperture diameter, and the aperture device is arranged between the first lens group and the second lens group.

In addition, in the optical system, when a distance from a lens face closest to the object side to the imaging plane in the optical system is OAL, it is satisfied that: $1.20 \leq OAL/f \leq 2.30$.

In addition, in the optical system, it is satisfied that: $1.00 \leq (1-b2^2) \times b3^2 \leq 1.70$.

In addition, in the optical system, when a refractive index of the at least one lens in the first lens group on a d-line is nd1 and an Abbe number based on the d-line of the at least one lens in the first lens group is vd1, it is satisfied that: $1.50 \leq nd1 \leq 1.70$ and $15.00 \leq vd1 \leq 60.00$.

In addition, in the optical system, when a refractive index of the at least one lens in the third lens group on a d-line is nd3 and an Abbe number based on the d-line of the at least one lens in the third lens group is vd3, it is satisfied that: $1.50 \leq nd3 \leq 1.70$ and $15.00 \leq vd3 \leq 60.00$.

In addition, in the optical system, at least the first lens group among the first lens group, the second lens group, and the third lens group is configured to be movable towards the image side when not photographing.

In addition, a camera device of the present disclosure has any of the above optical systems; and a photographing element arranged at the imaging plane of the optical system.

Although the present disclosure has been properly and fully explained by embodiments with reference to the attached drawings in order to show the present disclosure, those skilled in the art should realize that it is easy to change and/or improve the above embodiments. Therefore, as long as the alteration or improvement carried out by a person skilled in the art is not beyond the scope of the claims recorded in the claims, it may be interpreted that the alteration or improvement is included in the scope of the claims.

DESCRIPTION OF REFERENCE NUMERALS

1: camera device
2: optical system,
21: aperture diaphragm (aperture device)
22: lens barrel
23: optical filter
3: photographing element
4: Liquid crystal display screen
10: camera device body
C: optical axis
F: focusing lens group
G1: first lens group
G2: second lens group
G3: third lens group

What is claimed is:
1. An optical system, comprising:
a first lens group comprising, sequentially from an object side to an image side, at least one lens and having a negative refractive power, a second lens group comprising at least one lens and having a positive refractive power, and a third lens group comprising at least one lens and having a negative refractive power, wherein during focusing, distances between the first lens group and an imaging plane and between the third lens group and the imaging plane on an optical axis are fixed, and the second lens group moves along the optical axis, wherein when a lateral magnification of the second lens group focusing at infinity is b2, a lateral magnification of the third lens group focusing at infinity is b3, a focal length of the optical system focusing at infinity is f, a focal length of the second lens group is f2, a focal length of the third lens group is f3, a total value of distances from a lens face closest to the object side to a lens face closest to the image side in each lens group is OAL123, and a maximum image height is Y, at least one of the following formulas (1) to (4) is satisfied:

$$-1.20 \leq f3/f \leq -0.10 \qquad (1)$$

$$-0.40 \leq b2 \leq -0.06 \qquad (2)$$

$$0.3 \leq OAL123/Y \leq 2.30 \text{ and } 1.00 \leq b3 \leq 1.30 \qquad (3)$$

$$0.60 \leq f2/f \leq 0.90, \text{ and} \qquad (4)$$

wherein the second lens group is movable in a direction orthogonal to the optical axis, and it is satisfied that:

$$1.00 \leq (1-b2) \times b3 \leq 1.90.$$

2. The optical system according to claim 1, wherein, it is satisfied that:

$$1.15 \leq (1-b2) \times b3 \leq 1.80.$$

3. The optical system according to claim 1, when a focal length of the first lens group is f1, it is satisfied that:

$$-16.00 \leq f1/f \leq -1.80.$$

4. The optical system according to claim 3, wherein, it is satisfied that:

$$-10.00 \leq f1/f \leq -2.00.$$

5. The optical system according to claim 1, further comprising:

an aperture device located between the first lens group and the second lens group and having an adjustable aperture diameter.

6. The optical system according to claim 1, wherein, when a distance from a lens face closest to the object side to the imaging plane in the optical system is OAL, it is satisfied that:

$$1.20 \leq OAL/f \leq 2.30.$$

7. The optical system according to claim 6, wherein, it is satisfied that:

$$1.35 \leq OAL/f \leq 2.10.$$

8. The optical system according to claim 1, wherein, it is satisfied that:

$$1.00 \leq (1-b2^2) \times b3^2 \leq 1.70.$$

9. The optical system according to claim 8, wherein, it is satisfied that:

$$1.10 \leq (1-b2^2) \times b3^2 \leq 1.60.$$

10. The optical system according to claim 8, wherein, it is satisfied that:

$$1.54 \leq nd1 \leq 1.69.$$

11. The optical system according to claim 1, wherein, when a refractive index of the at least one lens in the first lens group on a d-line is nd1 and an Abbe number based on the d-line of the at least one lens in the first lens group is vd1, it is satisfied that:

$$1.50 \leq nd1 \leq 1.70 \text{ and } 15.00 \leq vd1 \leq 60.00.$$

12. The optical system according to claim 1, wherein, when a refractive index of the at least one lens in the third lens group on a d-line is nd3 and an Abbe number based on the d-line of the at least one lens in the third lens group is vd3, it is satisfied that:

$$1.50 \leq nd3 \leq 1.70 \text{ and } 15.00 \leq vd3 \leq 60.00.$$

13. The optical system according to claim 1, wherein, at least the first lens group among the first lens group, the second lens group, and the third lens group is movable towards the image side when not photographing.

14. A camera device, comprising:

an optical system according to claim 1; and a photographing element arranged at an imaging plane of the optical system.

15. The optical system according to claim 1, wherein, it is satisfied that:

$$-1.10 \leq f3/f \leq -0.50.$$

16. The optical system according to claim 1, wherein, it is satisfied that:

$$-0.38 \leq b2 \leq -0.10.$$

17. The optical system according to claim 1, wherein, it is satisfied that:

$$0.50 \leq OAL123/Y \leq 2.00.$$

18. The optical system according to claim 1, wherein, it is satisfied that:

$$1.05 \leq b3 \leq 1.26.$$

19. The optical system according to claim 1, wherein, it is satisfied that:

$$0.70 \leq f2/f \leq 0.85.$$

* * * * *